US009538438B2

(12) United States Patent
Wang et al.

(10) Patent No.: US 9,538,438 B2
(45) Date of Patent: Jan. 3, 2017

(54) METHOD AND APPARATUS FOR TRANSFERRING BEARING IN LAYERED NETWORK

(71) Applicant: China Academy of Telecommunications Technology, Beijing (CN)

(72) Inventors: Ying Wang, Beijing (CN); Nan Yan, Beijing (CN); Dajun Zhang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/648,564

(22) PCT Filed: Dec. 16, 2013

(86) PCT No.: PCT/CN2013/089590
§ 371 (c)(1),
(2) Date: May 29, 2015

(87) PCT Pub. No.: WO2014/094582
PCT Pub. Date: Jun. 26, 2014

(65) Prior Publication Data
US 2015/0304916 A1  Oct. 22, 2015

(30) Foreign Application Priority Data

Dec. 17, 2012 (CN) .......................... 2012 1 0548697

(51) Int. Cl.
*H04W 36/04* (2009.01)
*H04W 36/18* (2009.01)
(Continued)

(52) U.S. Cl.
CPC ............. *H04W 36/04* (2013.01); *H04W 16/32* (2013.01); *H04W 24/10* (2013.01); *H04W 36/18* (2013.01);
(Continued)

(58) Field of Classification Search
None
See application file for complete search history.

(56) References Cited

U.S. PATENT DOCUMENTS

2012/0100860 A1    4/2012  Lei et al.
2012/0201206 A1*   8/2012  Wang ............... H04L 12/185
                                                      370/329

(Continued)

FOREIGN PATENT DOCUMENTS

CN    101801054    8/2010
CN    101841874    9/2010
(Continued)

OTHER PUBLICATIONS

Extended European Search Report for EP Application No. 13864405.9 mailed Dec. 22, 2015.
(Continued)

*Primary Examiner* — Leon-Viet Nguyen
(74) *Attorney, Agent, or Firm* — Foley & Lardner LLP; James F. Ewing; Paul M. H. Pua

(57) ABSTRACT

A method and apparatus for transferring bearing in a layered network are disclosed in the embodiments of the present application, which relate to wireless communications field and are used to avoid failure when transferring bearing in user layer so as to improve communications quality of users. In the present application, after judging the need for transferring a Data Wireless Bearing DRB of a terminal to a Closed Subscriber Group CSG Local eNB, a Macro eNB determines whether to allow the terminal to access the CSG (Continued)

Local eNB and initiates a bearing transferring process to the CSG Local eNB if so. The CSG Local eNB accepts a bearing transferring request carrying CSG member status information of the terminal sent by the Macro eNB and implements accessing control for the separated bearing of the terminal according to the CSG member status information. Thus it can be seen said problems can be avoided.

15 Claims, 11 Drawing Sheets

(51) Int. Cl.
*H04W 48/02* (2009.01)
*H04W 16/32* (2009.01)
*H04W 24/10* (2009.01)
*H04W 76/02* (2009.01)
*H04W 76/04* (2009.01)
*H04W 84/04* (2009.01)
*H04W 92/20* (2009.01)

(52) U.S. Cl.
CPC ........... *H04W 48/02* (2013.01); *H04W 76/021* (2013.01); *H04W 76/023* (2013.01); *H04W 76/046* (2013.01); *H04W 84/045* (2013.01); *H04W 92/20* (2013.01)

(56) References Cited

U.S. PATENT DOCUMENTS

2012/0307796 A1* 12/2012 Liu .................. H04W 36/08
370/331
2014/0010204 A1* 1/2014 Xu .................. H04W 36/0033
370/331

FOREIGN PATENT DOCUMENTS

CN 101883347 11/2010
EP 2521399 11/2012

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP Standard; 3GPP TS 36.300, 3rd Generation Partnership Project (3GPP), Mobile Competence Centre , 650, Route Des Lucioles ; F-06921 Sophia-Antipolis Cedex; France, vol. RAN WG2, No. V11.3.0, Sep. 24, 2012, pp. 1-205, XP050649950, [retrieved on Sep. 24, 2012].
International Search Report for PCT/CN2013/089590 mailed Mar. 27, 2014.

* cited by examiner

METHOD AND APPARATUS FOR TRANSFERRING BEARING IN LAYERED NETWORK

This application is a US National Stage of International Application No. PCT/CN2013/089590, filed on Dec. 16, 2013, designating the United States and claiming the priority to Chinese Patent Application No. 201210548697.7, filed with the Chinese Patent Office on Dec. 17, 2012, the content of which is hereby incorporated by reference in its entirety.

FIELD

The present invention relates to the field of wireless communications and particularly to a method and device for transferring a bearer in layered network deployment.

BACKGROUND

As the statistics shows, a constantly growing demand of people for a data service rate and capacity has failed to be accommodated in a single-layer coverage network consisted of traditional macro eNBs, so that layered network deployment has been introduced in the $3^{rd}$ Generation Partnership Project (3GPP) to address this problem, that is, some low-power eNBs, i.e., local eNBs (including femto eNBs, pico eNBs, relay nodes or other forms) are deployed in a hotspot area, a home indoor environment, an office environment or other small-coverage environments to thereby split a cell so as to enable an operator to provide a user with a service at a higher data rate and a lower cost.

FIG. 1 illustrates a network architecture of an Evolved Universal Terrestrial Radio Access Network (E-UTRNA) consisted of eNodeBs (eNBs), Home eNodeBs (HeNBs), etc.

A Mobility Management Entity (MME) is connected with an eNB via an S1-MME interface; and the eNB functions as an access network and communicates with a User Equipment (UE) via an air interface. Each UE attached to the network is served by an MME which is referred to as a serving MME of the UE. The S1-MME interface provides the UE with control plane services including mobility management and bearer management functions.

A HeNB can be connected directly with a core network node MME or can access the network through a HeNB Gateway (GW) node. Both the HeNB GW and the eNB are equivalent from the perspective of the MME, and both the HeNB GW and the MME are equivalent from the perspective of the HeNB.

An SGW is connected with an eNB via an S1-U interface, and each UE attached to the network is served by an SGW which is referred to as a serving SGW of the UE. The S1-U interface provides the UE with user plane services, and user plane data of the UE is transmitted between the SGW and the eNB over an S1-U General Packet Radio Service (GPRS) Tunneling Protocol (GTP) bearer.

The S1-U interface of the HeNB can be terminated at the HeNB GW, or the S1-U interface can be set up directly between the HeNB and the SGW.

An X2 interface can be set up between HeNBs, and an X2 Interface can also be set up between the HeNB and the macro eNB.

Mobility scenario of the X2 interface supported by the HeNB are as depicted in Table 1 below:

TABLE 1

| Source | Target | Notes |
|---|---|---|
| eNB or any HeNB<br>eNB or any HeNB<br>Hybrid access HeNB<br>or closed access<br>HeNB | Open access HeNB<br>Hybrid access HeNB<br>Closed access HeNB | Only applies for same Closed Subscriber Group (CSG) ID and Public Land Mobile Network (PLMN), and if the UE is a member of the CSG cell.) |
| Any HeNB | eNB | |

In order to lower the frequency at which the UE is handed over between a macro eNB cell and a local eNB cell, a network deployment scheme in which the user plane is separated from the control plane has been introduced as illustrated in FIG. 2.

In this scheme, when the UE resides in an area covered only by the macro eNB cell, both control plane connections and user plane connections of the UE are active at the macro eNB; and when the UE is moved to an area covered by both the macro eNB cell and the local eNB cell, all or a part of the user plane connections (i.e., Data Radio Bearers (DRBs)) of the UE are transferred to the local eNB for a higher service transmission rate, and most of the control plane connections remain active at the macro eNB to thereby prevent a call of the UE from being dropped due to a handover failure of a control plane connection.

FIG. 3 illustrates a handover procedure of the UE in the traditional LTE network:

Operation 1. The source eNB configures the UE to make measurement, and the UE makes measurement according to received measurement configuration information;

Operation 2. The UE reports a measurement result over an uplink resource allocated by the source eNB for the UE, to assist the source eNB in making a handover decision;

Operation 3. The source eNB makes a handover decision. If the source eNB decides to perform handover, then the flow proceeds to the following operations;

Operation 4. The source eNB transmits a handover request message carrying handover preparation related information to the target eNB;

Operation 5. The target eNB refers to the handover request message and makes an admission decision according to QoS information of a bearer to be admitted. If the target eNB allows the UE to be admitted, then the target eNB configures a lower layer to prepare for handover;

Operation 6. The target eNB returns a handover request response message including an RRC container, which is particularly a handover command to trigger the handover of the UE, to the source eNB;

Operation 7. The source eNB transmits the received handover command transparently (without any modification thereto) to the UE over a scheduled downlink resource; and the UE stops data from being transmitted and received with the source eNB upon reception of the handover command;

Operation 8. The source eNB transmits sequence number (SN) status information of ongoing data transmission (e.g., a sequence number of an unsuccessfully transmitted downlink data packet, a first sequence number which can be allocated by the target eNB, etc.) to the target eNB so that sequence numbers of data transmitted and received by the source eNB and the target eNB are consecutive to thereby avoid any packet from being lost or retransmitted;

Subsequent to the operation 8, the source eNB can transmit its downlink data packets, received from the core network but unsuccessfully transmitted to the UE, to the target eNB so that the target eNB transmits them to the UE; and alike the source eNB can transmit uplink data packets of the UE, received via the air interface, with inconsecutive sequence numbers (a packet transmitted later by the UE may be received successfully by the DeNB before a packet transmitted earlier is received successfully by the DeNB due to an error in transmission via the air interface so that there may be inconsecutive sequence numbers of the packets received by the DeNB) to the target eNB so that the target eNB transmits the data packets with consecutive sequence numbers to the core network upon reception of absent data packets retransmitted by the UE.

Operation 9. The UE transmits a preamble to the target eNB for uplink synchronization with the target eNB;

Operation 10. The target eNB returns a response message carrying an uplink resource allocated for the UE (for subsequent transmission) and a timing advance of the UE (to adjust uplink transmission instance of time of the UE for uplink synchronization);

Operation 11. The UE returns a handover completion message to the target eNB;

Thereafter data can be transmitted and received between the UE and the target eNB.

Operation 12. The target eNB transmits to the MME a path switch request carrying user plane transport layer addresses (IP addresses) and downlink GTP tunnel identifiers (Tunnel Endpoint Identifiers (TEIDs)) specified by the target eNB respectively for respective Evolved Packet System (EPS) bearers of the UE;

Operation 13. The MME transmits to the SGW a bearer modification request carrying the user plane transport layer addresses (IP addresses) and the downlink GTP tunnel identifiers (TEIDs) specified by the target eNB respectively for the respective EPS bearers of the UE;

Operation 14. The SGW switches the path;

Operation 15. The SGW returns to the MME a bearer modification response carrying user plane transport layer addresses (IP addresses) and uplink GTP tunnel identifiers (TEIDs) specified by the SGW respectively for the respective EPS bearers of the UE;

Operation 16. The MME returns to the target eNB a path switch response carrying the user plane transport layer addresses (IP addresses) and the uplink GTP tunnel identifiers (TEIDs) specified by the SGW respectively for the respective EPS bearers of the UE;

The path has been switched so far. Thereafter for a downlink data packet transmitted to the UE, the SGW can transmit it to the corresponding user plane transport layer address (IP address) specified by the target eNB, and set the downlink GTP tunnel identifier (TEID), according to a bearer to which it belongs; and for an uplink data transmitted by the UE, the target eNB can transmit it to the corresponding user plane transport layer address (IP address) specified by the SGW, and set the uplink GTP tunnel identifier (TEID), according to a bearer to which it belongs;

Operation 17. The target eNB transmits a UE context release request to the source eNB;

Operation 18. The source eNB releases the related resources allocated for the handed over UE.

FIG. 4 illustrates a flow chart of requesting by the UE for a service:

Operations 1 to 3: The UE initiates a Radio Resource Control (RRC) connection setup procedure to the cell where it resides;

Operation 4: After an RRC connection is set up, the serving eNB initiates an S1 signaling setup procedure to the MME by transmitting S1 signaling which is an initial UE message carrying a Non-Access Stratum (NAS) service request message;

Operation 5. The MME trigger an initial context setup procedure of the UE upon reception of the initial UE message by transmitting an initial context setup request message carrying information about an Evolved Radio Access Bearer (E-RAB) to be set up, e.g., Quality of Service (QoS) information, a transport layer address, etc.;

Operation 6. The serving eNB performs access control according to the QoS information of the E-RAB;

Operation 7. If the serving eNB allows the UE to access, then the serving eNB generates an RRC reconfiguration message and transmits it to the UE;

Operation 8. The UE reconfigures all the DRB resources and subsequently transmits an RRC reconfiguration completion message to the serving eNB;

Operation 9. The serving eNB transmits an initial context response message carrying a downlink transport layer address of the serving eNB to the MME; and Operations 10 to 11: The MME updates the bearer with the SGW. Thereafter the UE starts transmission of uplink and downlink data with the network.

There has been absent in the prior art a process of transferring a user plane bearer when a target local eNB is a Closed Subscriber Group (CSG) local eNB. If the process of transferring a bearer is applied where the target local eNB is a macro eNB, then a user plane bearer may fail to be transferred, thus degrading reception and transmission by the UE of the service, because when the CSG local eNB operates in the hybrid access mode, only a UE belonging to a CSG (which can be any CSG) can be allowed to access, and if a bearer of a UE which does not belong to the CSG is transferred to the CSG local eNB, then the UE bearer may fail to be transferred; and if the eNB operates in the closed access mode, then only a UE belonging to a CSG of the CSG local eNB can be allowed to access, and if a bearer of a UE which does not belong to the CSG of the CSG local eNB is transferred to the CSG local eNB, then the UE bearer may fail to be transferred.

SUMMARY

Embodiments of the invention provide a method and device for transferring a bearer in layered network deployment so as to avoid a user plane bearer from failing to be transferred as much as possible to thereby improve a communication quality of a UE.

A method for transferring a bearer in layered network deployment includes:

determining, by a macro eNB, whether to allow a user equipment to access a Closed Subscriber Group (CSG) local eNB upon determining that a Data Radio Bearer (DRB) of the user equipment needs to be transferred to the CSG local eNB; and initiating, by the macro eNB, a bearer transfer procedure to the CSG local eNB upon determining that the user equipment is allowed to access the CSG local eNB.

Optionally determining whether to allow the user equipment to access the CSG local eNB includes:

determining, by the macro eNB, whether to allow the user equipment to access the CSG local eNB according to CSG membership status information carried in a measurement report made by the user equipment.

Optionally initiating the bearer transfer procedure to the CSG local eNB includes:

transmitting, by the macro eNB, a bearer transfer request carrying the CSG membership status information reported by the user equipment, to the CSG local eNB.

Optionally the method further includes:

transmitting, by the macro eNB, information about a CSG identifier, and an access mode, of the CSG local eNB to a Mobility Management Entity (MME) upon determining that the bearer has been transferred;

receiving, by the macro eNB, information about whether to allow the user equipment to access the CSG local eNB, or the CSG membership status information of the user equipment, returned by the MME; and transmitting, by the macro eNB, the information returned by the MME to the CSG local eNB; or matching, by the macro eNB, the information returned by the MME with the CSG membership status information reported by the user equipment, and if they match successfully, then not transmitting the information returned by the MME to the CSG local eNB, otherwise, transmitting the information returned by the MME to the CSG local eNB.

Optionally the macro eNB determines that the DRB of the user equipment needs to be transferred to the CSG local eNB, upon reception of the measurement report made by the user equipment;

the bearer transfer request is a user plane handover message; and the macro eNB determines that the bearer has been transferred, upon reception of a user plane handover completion message transmitted by the user equipment; the macro eNB transmits the information about the CSG identifier, and the access mode, of the CSG local eNB to the MME in a path switch request message; the macro eNB receives the information about whether to allow the user equipment to access the CSG local eNB, or the CSG membership status information of the user equipment, returned by the MME in a path switch request response message; and the macro eNB transmits the information returned by the MME to the CSG local eNB in a path switch request response message.

Optionally the macro eNB determines that the DRB of the user equipment needs to be transferred to the CSG local eNB, upon reception of the measurement report made by the user equipment;

the bearer transfer request is a DRB link configuration message; and the macro eNB determines that the bearer has been transferred, upon reception of a Radio Resource Control (RRC) connection reconfiguration completion message transmitted by the user equipment; the macro eNB transmits the information about the CSG identifier, and the access mode, of the CSG local eNB to the MME in a CSG check request message; and the macro eNB transmits the information returned by the MME to the CSG local eNB in a CSG modification message.

Optionally the macro eNB determines that the DRB of the user equipment needs to be transferred to the CSG local eNB, upon reception of an initial context setup request transmitted by the MME in a service request procedure initiated by the user equipment;

the bearer transfer request is a bearer setup request message; and the macro eNB determines that the bearer has been transferred, upon reception of an RRC connection reconfiguration completion message transmitted by the user equipment; the macro eNB transmits the information about the CSG identifier, and the access mode, of the CSG local eNB to the MME in a CSG check request message; and the macro eNB transmits the information returned by the MME to the CSG local eNB in a CSG modification message.

Optionally in another implementation, determining whether to allow the user equipment to access the CSG local eNB includes:

transmitting, by the macro eNB, information about a CSG identifier, and an access mode, of the CSG local eNB to an MME;

receiving, by the macro eNB, information about whether to allow the user equipment to access the CSG local eNB, or CSG membership status information of the user equipment, returned by the MME; and determining, by the macro eNB, whether to allow the user equipment to access the CSG local eNB according to the information returned by the MME.

Optionally in another implementation, initiating the bearer transfer procedure to the CSG local eNB includes:

transmitting, by the macro eNB, a bearer transfer request carrying the CSG membership status information of the user equipment returned by the MME, to the CSG local eNB.

Optionally in another implementation, the macro eNB determines that the DRB of the user equipment needs to be transferred to the CSG local eNB, upon reception of a measurement report made by the user equipment; and the macro eNB transmits information about a CSG identifier, and an access mode, of the CSG local eNB to the MME in a CSG check request message;

the bearer transfer request is a DRB link configuration message.

Optionally in another implementation, the macro eNB determines that the DRB of the user equipment needs to be transferred to the CSG local eNB, upon reception of an initial context setup request transmitted by the MME in a service request procedure initiated by the user equipment; and the macro eNB transmits information about a CSG identifier, and an access mode, of the CSG local eNB to the MME in a CSG check request message; and the bearer transfer request is a bearer setup request message.

Optionally in another implementation, the macro eNB determines that the DRB of the user equipment needs to be transferred to the CSG local eNB, upon reception of an initial context setup request transmitted by the MME in a service request procedure initiated by the user equipment; and the macro eNB transmits information about a CSG identifier, and an access mode, of the CSG local eNB to the MME in an initial user equipment message; and the macro eNB receives the information about whether to allow the user equipment to access the CSG local eNB, or the CSG membership status information of the user equipment, returned by the MME in an initial context setup request message; and the bearer transfer request is a bearer setup request message.

A method for transferring a bearer in layered network deployment includes:

receiving, by a Closed Subscriber Group (CSG) local eNB, a bearer transfer request, transmitted by a macro eNB, carrying CSG membership status information of a user equipment, in a bearer transfer procedure initiated by the macro eNB for the user equipment; and performing, by the CSG local eNB, admission control on a bearer of the user equipment according to the CSG membership status information.

Optionally the bearer transfer request carries the CSG membership status information which is CSG membership status information carried in a measurement report made by the user equipment.

Optionally the method further includes:

after the bearer has been transferred, receiving, by the CSG local eNB, information about whether to allow the user equipment to access the CSG local eNB, or the CSG membership status information of the user equipment, transmitted by the macro eNB; and providing, by the CSG local eNB, a QoS support mechanism for the bearer of the user equipment switched to the CSG local eNB according to the information about whether to allow the user equipment to access the CSG local eNB, or the CSG membership status information of the user equipment.

Optionally the bearer transfer request is a user plane handover message; and the CSG local eNB receives the information about whether to allow the user equipment to access the CSG local eNB, or the CSG membership status information of the user equipment, transmitted by the macro eNB in a path switch request response message; or the bearer transfer request is a DRB link configuration message; and the CSG local eNB receives the information about whether to allow the user equipment to access the CSG local eNB, or the CSG membership status information of the user equipment, transmitted by the macro eNB in a CSG modification message; or the bearer transfer request is a bearer setup request message; and the CSG local eNB receives the information about whether to allow the user equipment to access the CSG local eNB, or the CSG membership status information of the user equipment, transmitted by the macro eNB in a CSG modification message.

Optionally the bearer transfer request carries the CSG membership status information which is CSG membership status information of the user equipment obtained by the macro eNB from the MME; and the CSG local eNB provides a QoS support mechanism for the bearer of the user equipment switched to the CSG local eNB further according to the CSG membership status information.

Optionally the bearer transfer request is a DRB link configuration message; or the bearer transfer request is a bearer setup request message.

A method for transferring a bearer in layered network deployment includes:

receiving, by a Mobility Management Entity (MME), information about a CSG identifier, and an access mode, of a CSG local eNB, transmitted by a macro eNB;

determining, by the MME, whether to allow a user equipment to access the CSG local eNB, or obtaining CSG membership status information in subscription information of the user equipment, according to the information about the CSG identifier and the access mode, and the subscription information of the user equipment; and returning, by the MME, information about whether to allow the user equipment to access the CSG local eNB, or the CSG membership status information of the user equipment to the macro eNB.

Optionally the MME receives the information about the CSG identifier, and the access mode, of the CSG local eNB transmitted by the macro eNB in a path switch request message; and the MME returns the information about whether to allow the user equipment to access the CSG local eNB, or the CSG membership status information of the user equipment to the macro eNB in a path switch request response message; or the MME receives the information about the CSG identifier, and the access mode, of the CSG local eNB transmitted by the macro eNB in a CSG check request message; or the MME receives the information about the CSG identifier, and the access mode, of the CSG local eNB transmitted by the macro eNB in an initial user equipment message; and the MME returns the information about whether to allow the user equipment to access the CSG local eNB, or the CSG membership status information of the user equipment to the macro eNB in an initial context setup request message.

A macro eNB includes:

a determining unit configured to determine whether to allow a user equipment to access a Closed Subscriber Group (CSG) local eNB upon determining that a Data Radio Bearer (DRB) of the user equipment needs to be transferred to the CSG local eNB; and an initiating unit configured to initiate a bearer transfer procedure to the CSG local eNB upon determining that the user equipment is allowed to access the CSG local eNB.

A macro eNB includes a processor and a data reception and transmission interface, wherein:

the processor is configured to determine whether to allow a user equipment to access a Closed Subscriber Group (CSG) local eNB upon determining that a Data Radio Bearer (DRB) of the user equipment needs to be transferred to the CSG local eNB; and to initiate a bearer transfer procedure to the CSG local eNB upon determining that the user equipment is allowed to access the CSG local eNB; and the data reception and transmission interface is configured to communicate data between the processor and the CSG local eNB.

A closed subscriber group local eNB includes:

a receiving unit configured to receive a bearer transfer request, transmitted by a macro eNB, carrying CSG membership status information of a user equipment, in a bearer transfer procedure initiated by the macro eNB for the user equipment; and a controlling unit configured to perform admission control on a bearer of the user equipment according to the CSG membership status information.

Optionally the receiving unit is configured to receive the bearer transfer request carrying the CSG membership status information which is CSG membership status information carried in a measurement report made by the user equipment.

Optionally the CSG local eNB further includes:

a QoS supporting unit configured, after the bearer has been transferred, for the CSG local eNB to receive information about whether to allow the user equipment to access the CSG local eNB, or the CSG membership status information of the user equipment, transmitted by the macro eNB; and to provide a QoS support mechanism for the bearer of the user equipment switched to the CSG local eNB according to the information about whether to allow the user equipment to access the CSG local eNB, or the CSG membership status information of the user equipment.

Optionally the receiving unit is configured to receive the bearer transfer request which is a user plane handover message; and the QoS supporting unit is configured to receive the information about whether to allow the user equipment to access the CSG local eNB, or the CSG membership status information of the user equipment, transmitted by the macro eNB in a path switch request response message; or the receiving unit is configured to receive the bearer transfer request which is a DRB link configuration message; and the QoS supporting unit is configured to receive the information about whether to allow the user equipment to access the CSG local eNB, or the CSG membership status information of the user equipment, transmitted by the macro eNB in a CSG modification message; or the receiving unit is configured to receive the bearer transfer request which is a bearer setup request message; and the QoS supporting unit is configured to receive the information about whether to allow the user equipment to access the CSG local eNB, or the CSG membership status information of the user equipment, transmitted by the macro eNB in a CSG modification message.

Optionally the receiving unit is configured to receive the bearer transfer request carrying the CSG membership status information which is CSG membership status information of the user equipment obtained by the macro eNB from the MME; and the controlling unit is configured to provide a QoS support mechanism for the bearer of the user equipment switched to the CSG local eNB further according to the CSG membership status information.

Optionally the receiving unit is configured to receive the bearer transfer request which is a DRB link configuration message; or the receiving unit is configured to receive the bearer transfer request which is a bearer setup request message.

A closed subscriber group local eNB includes a processor and a data reception and transmission interface, wherein:

the processor is configured to receive a bearer transfer request, transmitted by a macro eNB, carrying CSG membership status information of a user equipment, in a bearer transfer procedure initiated by the macro eNB for the user equipment; and to perform admission control on a bearer of the user equipment according to the CSG membership status information; and the data reception and transmission interface is configured to communicate data between the processor and the macro eNB, and between the processor and the user equipment.

A mobility management entity includes:

a receiving unit configured to receive information about a CSG identifier, and an access mode, of a CSG local eNB, transmitted by a macro eNB;

a determining and obtaining unit configured to determine whether to allow a user equipment to access the CSG local eNB, or to obtain CSG membership status information in subscription information of the user equipment, according to the information about the CSG identifier and the access mode, and the subscription information of the user equipment; and a transmitting unit configured to return information about whether to allow the user equipment to access the CSG local eNB, or the CSG membership status information of the user equipment to the macro eNB.

Optionally the receiving unit is configured to receive the information about the CSG identifier, and the access mode, of the CSG local eNB transmitted by the macro eNB in a path switch request message; and the transmitting unit is configured to return the information about whether to allow the user equipment to access the CSG local eNB, or the CSG membership status information of the user equipment to the macro eNB in a path switch request response message; or the receiving unit is configured to receive the information about the CSG identifier, and the access mode, of the CSG local eNB transmitted by the macro eNB in a CSG check request message; or the receiving unit is configured to receive the information about the CSG identifier, and the access mode, of the CSG local eNB transmitted by the macro eNB in an initial user equipment message; and the transmitting unit is configured to return the information about whether to allow the user equipment to access the CSG local eNB, or the CSG membership status information of the user equipment to the macro eNB in an initial context setup request message.

A mobility management entity includes a processor and a data reception and transmission interface, wherein:

the processor is configured to receive information about a CSG identifier, and an access mode, of a CSG local eNB, transmitted by a macro eNB; to determine whether to allow a user equipment to access the CSG local eNB, or to obtain CSG membership status information in subscription information of the user equipment, according to the information about the CSG identifier and the access mode, and the subscription information of the user equipment; and to return information about whether to allow the user equipment to access the CSG local eNB, or the CSG membership status information of the user equipment to the macro eNB; and the data reception and transmission interface is configured to communicate data between the processor and the macro eNB.

In the solutions according to the embodiments of the invention, after the macro eNB determines that the DRB of the user equipment needs to be transferred to the CSG local eNB, the macro eNB determines whether to allow the user equipment to access the CSG local eNB and initiates a bearer transfer procedure to the CSG local eNB upon determining that the user equipment is allowed to access the CSG local eNB, and in the bearer transfer procedure initiated by the macro eNB for the user equipment, the CSG local eNB receives a bearer transfer request, transmitted by the macro eNB, carrying the CSG membership status information of the user equipment and performs admission control on the bearer of the user equipment switched to the CSG local eNB according to the CSG membership status information. Apparently in these solutions, the macro eNB needs to determine whether to allow the user equipment to access the CSG local eNB, before initiating the bearer transfer procedure to the CSG local eNB, and will initiate the bearer transfer procedure to the CSG local eNB only if the user equipment is allowed to access, to thereby avoid the problem of a failure in the initiated bearer transfer because the user equipment is not a member of the CSG local eNB, so that the communication quality of the user equipment can be improved.

BRIEF DESCRIPTION OF THE DRAWINGS

FIG. 5b illustrates a schematic diagram of a user plane protocol stack for an interface between the macro eNB and the local eNB in the architecture illustrated in FIG. 5a;

FIG. 5c illustrates a schematic diagram of a control plane protocol stack for an interface between the macro eNB and the local eNB in the architecture illustrated in FIG. 5a;

DETAILED DESCRIPTION OF THE EMBODIMENTS

Figure 1:
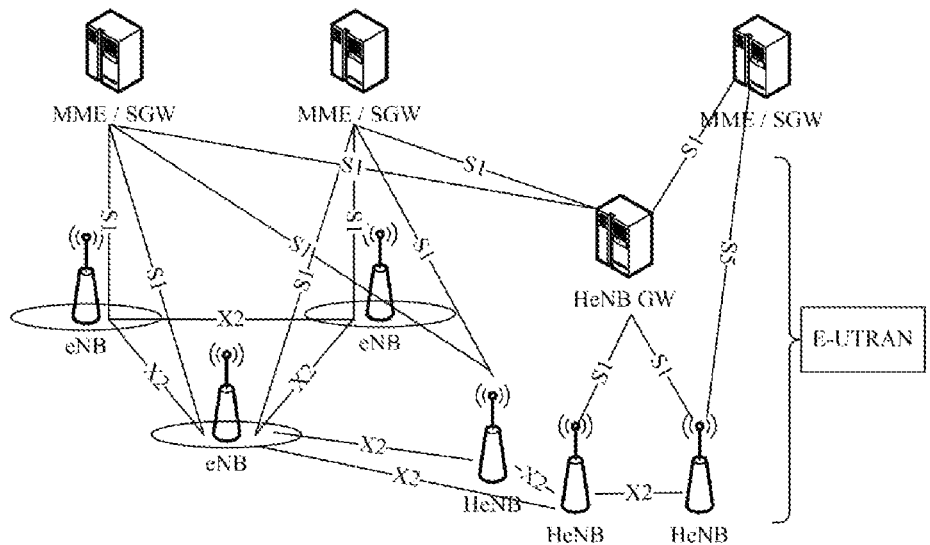
FIG. 1 illustrates a schematic architectural diagram of the E-UTRAN network in the prior art.
Figure 2:
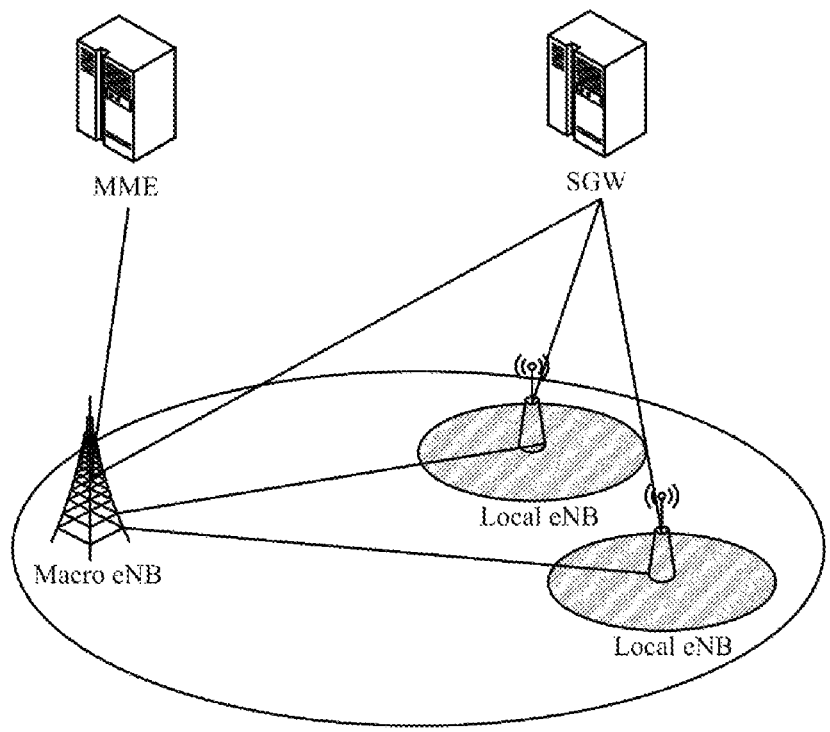
FIG. 2 illustrates a schematic architectural diagram of the network where the user plane is separated from the control plane in the prior art.
Figure 3:
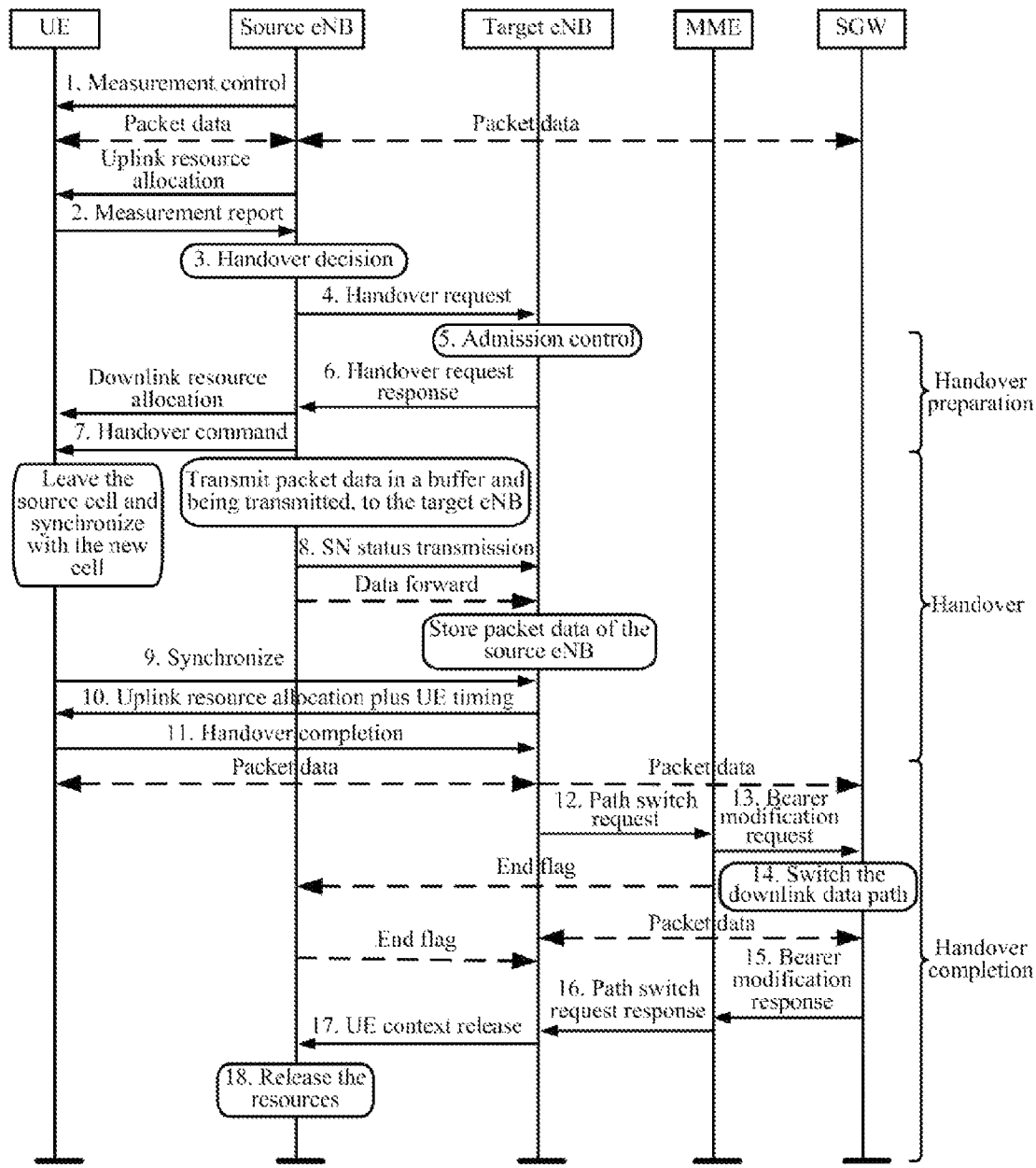
FIG. 3 illustrates a schematic diagram of the handover procedure of the UE in the prior art.
Figure 4:
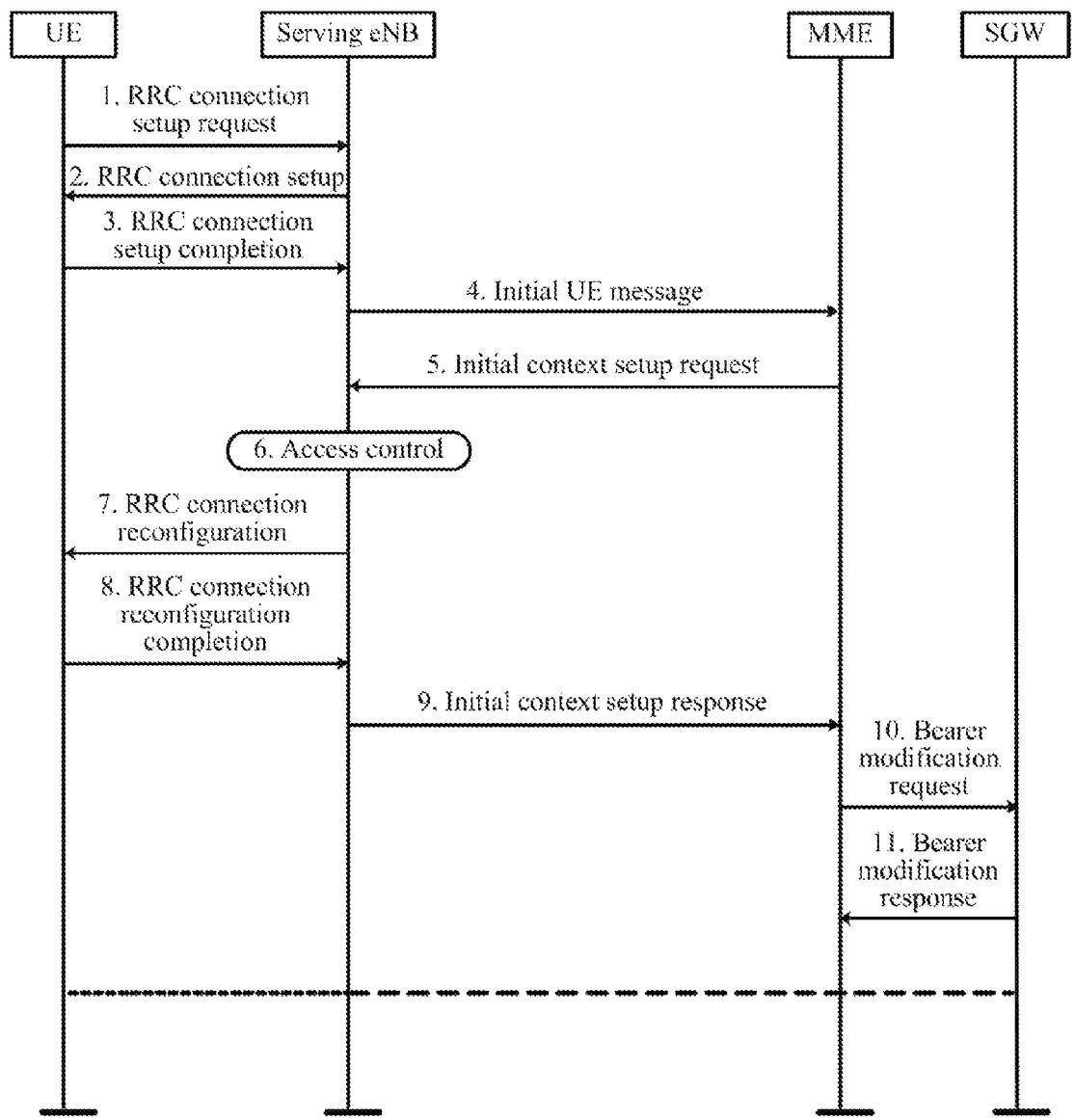
FIG. 4 illustrates a schematic flow chart of requesting for a service in the LTE system in the prior art.
Figure 5A:
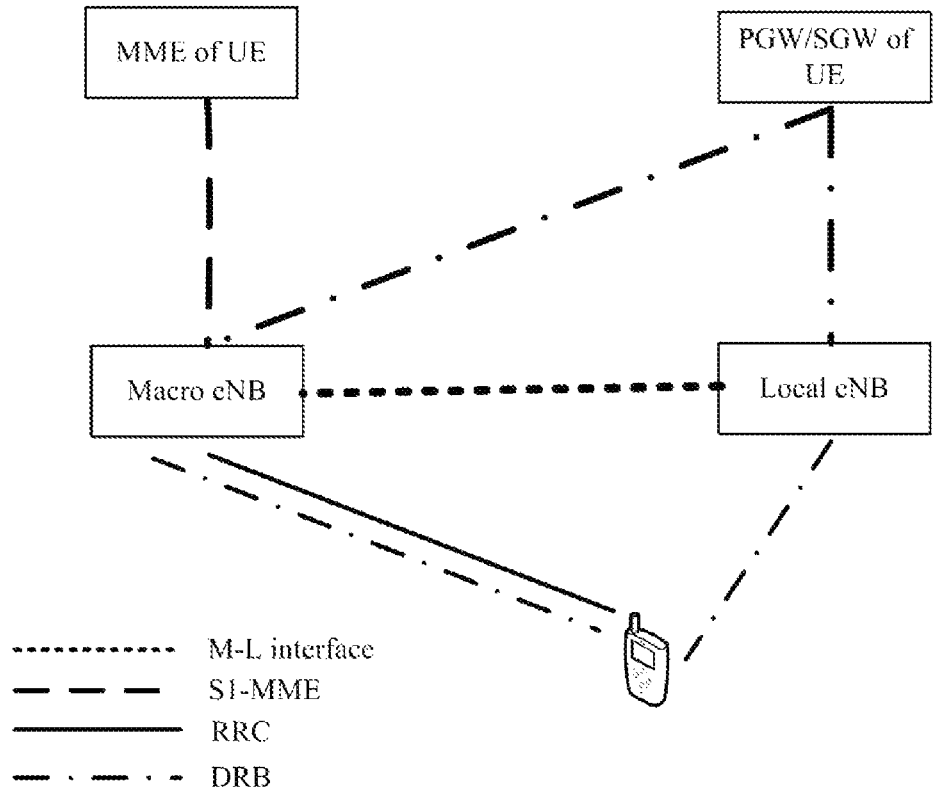
FIG. 5a illustrates a schematic diagram of an interface relationship in a first architecture where the user plane is separated from the control plane according to an embodiment of the invention.

In the case that the user plane is separated from the control plane of a UE, the UE is connected concurrently with two eNBs. FIG. 5a illustrates a first network architecture where the user plane is separated from the control plane, and here Signal Radio Bearers (SRBs) of the UE remain active at the macro eNB, and Packet Data Convergence Protocol (PDCP)/Radio Link Control (RLC)/Medium Access Control (MAC)/Physical (PHY) layers of all or a part of Data Radio Bearers (DRBs) remain active at the local eNB. In FIG. 5a, the M-L interface represents a logical interface between the macro eNB and the local eNB, which can be newly defined or can be an existing X2 interface. Uplink data of the UE arriving at the local eNB is transmitted directly to a Serving Gateway (SGW), and downlink data of the UE arriving at the SGW is transmitted directly to the local eNB, thereby alleviating a load of the macro eNB for processing data packets of the UE.

Figure 5B:
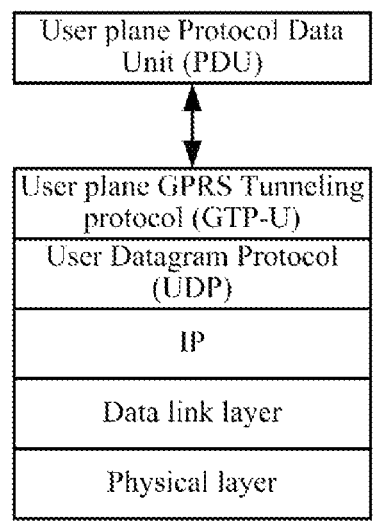

In the architecture illustrated in FIG. 5a, the local eNB includes all the functions of the PDCP/RLC/MAC/PHY layers of DRBs, and a path of S1-U is represented as the local eNB the SGW, so the logical interface between the macro eNB and the local eNB is primarily configured to forward data at the user plane after an access point is handed over; and thus a similar user plane protocol stack of an X2 interface can be applied as illustrated in FIG. 5b.

Figure 5C:
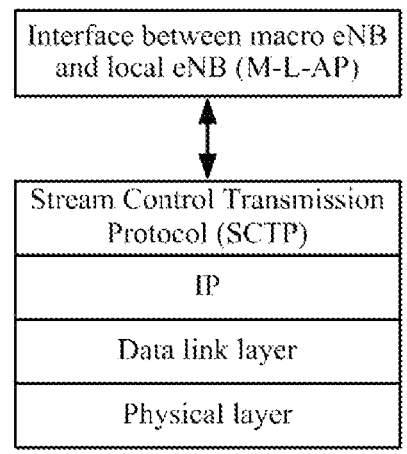

Similar to the user plane protocol stack, a similar control plane protocol stack of an X2 interface can also be applied as a control plane protocol stack as illustrated in FIG. 5c.

Unlike the traditional network, since the control plane is separated from the user plane so that all or a part of user plane bearers of the UE are transmitted with the local eNB, but a Radio Resource Control (RRC) entity controlling the user plane bearers is located at the macro eNB, so the macro eNB and the local eNB need to exchange bearer management related information, for example, the local eNB needs to transmit an instruction to admit a bearer, and configuration information of the bearer to the macro eNB. Thus the M-L interface needs to be provided with a link management function in addition to the functions of an X2 interface.

Figure 6:
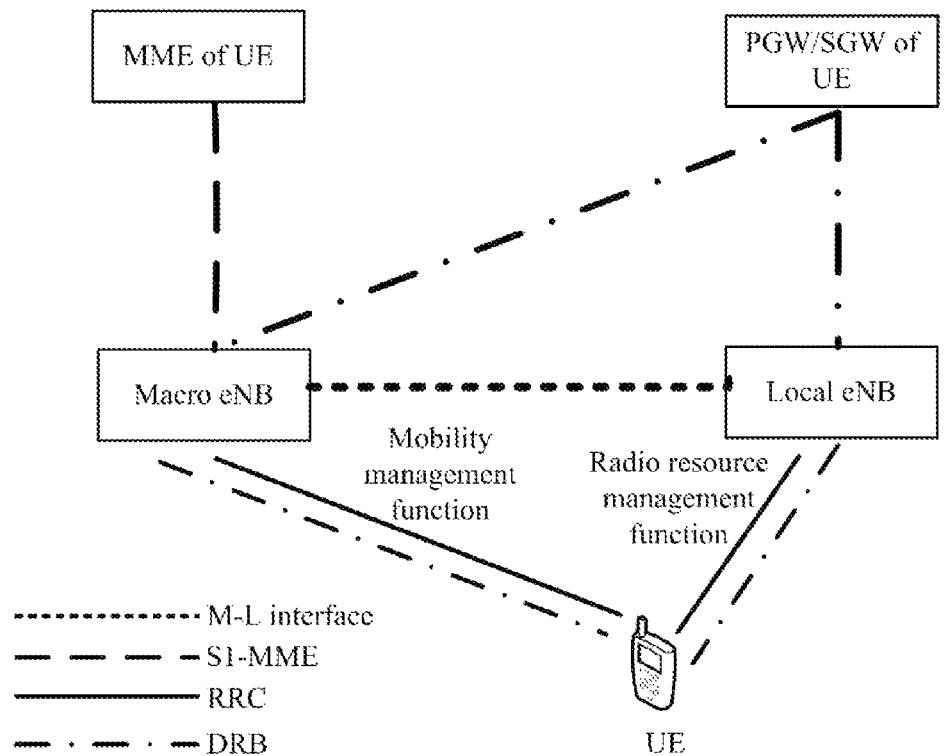
FIG. 6 illustrates a schematic diagram of an interface relationship in a second architecture where the user plane is separated from the control plane according to an embodiment of the invention.

FIG. 6 illustrates a second network architecture where the control plane is separated from the user plane, and in the case that the user plane is separated from the control plane, the macro eNB is provided with the entire user plane and control plane protocol stacks.

In this architecture, when the UE resides in an area covered only by the macro eNB cell, both the control plane connections and the user plane connections of the UE are active at the macro eNB; and when the UE is moved to an area covered by both the macro eNB cell and the local eNB cell, all or a part of the user plane connections, i.e., DRBs, of the UE are transferred to the local eNB for a higher service transmission rate, and most of the control plane connections remain active at the macro eNB to thereby prevent a call of the UE from being dropped due to a handover failure of a control plane connection, whereas a small part of the control plane connections, i.e., SRBs, are transferred to the local eNB to thereby guarantee radio resource management by the local eNB.

The user plane protocol stacks and the control plane protocol stacks of the MeNB and the local eNB are illustrated in FIG. 5b and FIG. 5c respectively.

Figure 7:
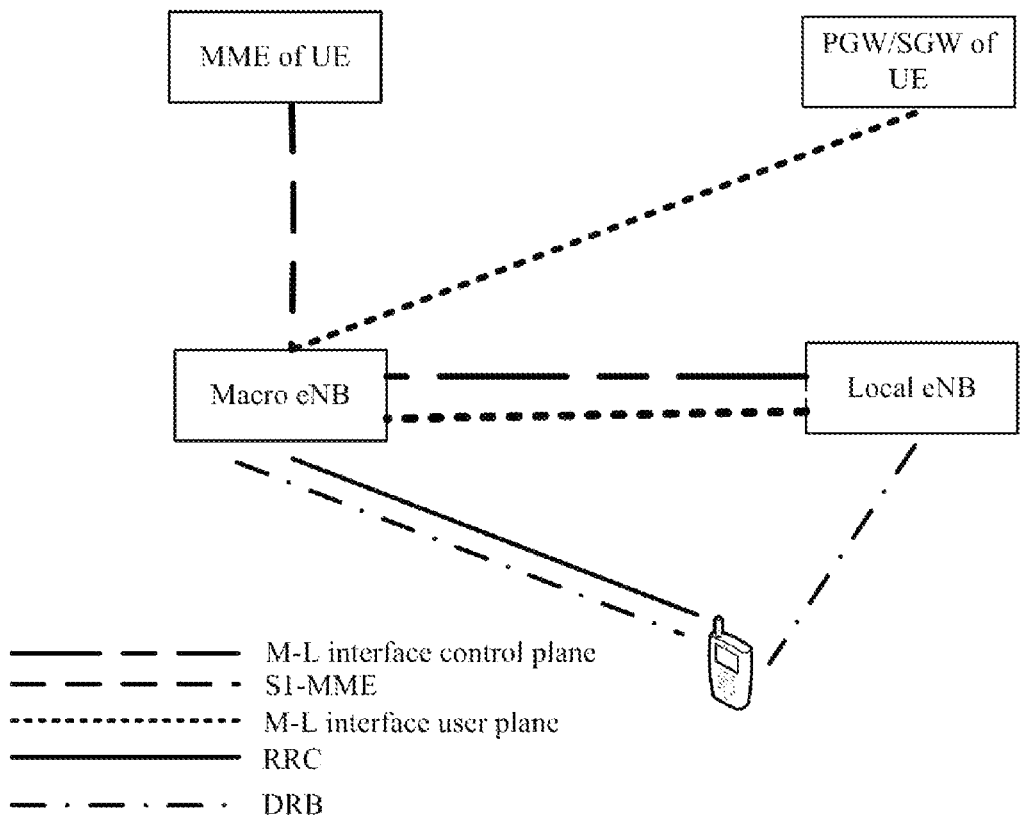
FIG. 7 illustrates a schematic diagram of an interface relationship in a third architecture where the user plane is separated from the control plane according to an embodiment of the invention.

FIG. 7 illustrates a third network architecture where the control plane is separated from the user plane, and in this architecture, user plane data are terminated at the macro eNB, so the path of all the Evolved Radio Access Bearers (E-RABs) is represented as the local eNB <-> the macro eNB <-> the SGW even in the architecture scenario where the control plane is totally separated from the user plane.

In this architecture, when the network discovers that the UE is gradually approaching or leaving a coverage area of some access point, with the technology where the control plane is separated from the user plane, RRC connections (i.e., SRBs) of the UE can remain active at the macro eNB, and only data connections (i.e., DRBs) of the UE are switched to a target access point; and here only the RLC/MAC/PHY layers of all the DRBs are switched to the new access point, and the PDCP layers remain active at the original access point. Alternatively the RLC/MAC/PHY layers of a part of the DRBs are switched to the new access point, and their PDCP layers remain active at the original access point.

The user plane protocol stacks and the control plane protocol stacks of the MeNB and the local eNB are illustrated in FIG. 5b and FIG. 5c respectively.

In order to avoid a user plane bearer from failing to be transferred as much as possible to thereby improve a communication quality of the UE, embodiments of the invention provide a method for transferring a bearer in layered network deployment.

Figure 8:
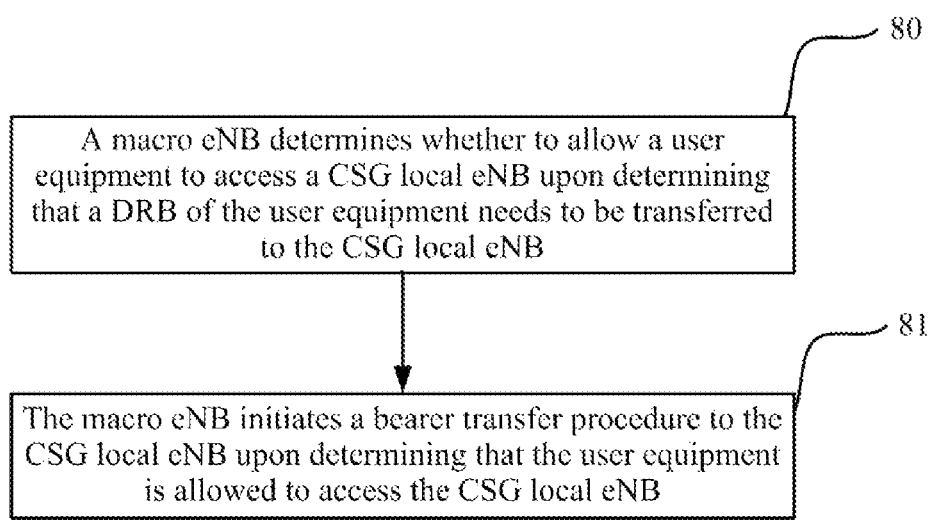
FIG. 8 illustrates a schematic flow chart of a method according to an embodiment of the invention.

Referring to FIG. 8, a method for transferring a bearer by a macro eNB in layered network deployment according to an embodiment of the invention includes the following operations:

Operation 80: A macro eNB determines whether to allow a user equipment to access a Closed Subscriber Group (CSG) local eNB upon determining that a Data Radio Bearer (DRB) of the user equipment needs to be transferred to the CSG local eNB; and here the CSG local eNB refers to a local eNB supporting the CSG feature;

Operation 81: The macro eNB initiates a bearer transfer procedure to the CSG local eNB upon determining that the user equipment is allowed to access the CSG local eNB.

In an implementation, the macro eNB can determine whether to allow the user equipment to access the CSG local eNB in the operation 80 particularly as follows:

The macro eNB determines whether to allow the user equipment to access the CSG local eNB according to CSG membership status information carried in a measurement report made by the user equipment. Here the CSG membership status information refers to information indicating which CSG cells the user equipment belongs to as a member. The macro eNB can determine whether to allow the user equipment to access the CSG local eNB as follows: the macro eNB determines whether the user equipment is a member of a CSG cell corresponding to the CSG local eNB according to the CSG membership status information carried in the measurement report made by the user equipment, and if so, then it determines that the user equipment is allowed to access the CSG local eNB; otherwise, it determines that the user equipment is not allowed to access the CSG local eNB.

Correspondingly the macro eNB can initiate the bearer transfer procedure to the CSG local eNB in the operation 81 particularly as follows:

The macro eNB transmits to the CSG local eNB a bearer transfer request carrying the CSG membership status information reported by the user equipment and of course also information about a bearer of the user equipment switched to the CSG local eNB; and the CSG local eNB can perform admission control on the bearer of the user equipment switched to the CSG local eNB according to the CSG membership status information.

Preferably the macro eNB transmits information about a CSG identifier, and an access mode, of the CSG local eNB to a Mobility Management Entity (MME) upon determining that the bearer has been transferred, so that the MME determines whether to allow the user equipment to access the CSG local eNB, or obtains CSG membership status information in subscription information of the user equipment, according to the information about the CSG identifier and the access mode, and the subscription information of the user equipment; and here the access mode is a hybrid access mode or a closed access mode, and if the access mode of the CSG local eNB is the closed access mode, then the a member of the CSG cell corresponding to the CSG local eNB is allowed to access the CSG local eNB, whereas if the access mode of the CSG local eNB is the hybrid access mode, then a member of any CSG cell is allowed to access the CSG local eNB;

The macro eNB receives information about whether to allow the user equipment to access the CSG local eNB, or the CSG membership status information of the user equipment, returned by the MME; and The macro eNB transmits the information returned by the MME to the CSG local eNB so that the CSG local eNB provides a QoS support mechanism for the bearer of the user equipment switched to the CSG local eNB according to the information returned by the MME; or the macro eNB matches the information returned by the MME with the CSG membership status information reported by the user equipment in the measurement report, and if they match successfully, then the macro eNB may not transmit the information returned by the MME to the CSG local eNB; otherwise, it transmits the information returned by the MME to the CSG local eNB so that the CSG local eNB provides a QoS support mechanism for the bearer of the user equipment switched to the CSG local eNB according to the information returned by the MME. Here the macro eNB can match the information returned by the MME with the CSG membership status information reported by the user equipment particularly as follows: when the information returned by the MME is the information about whether to allow the user equipment to access the CSG local eNB, the macro eNB determines whether to allow the user equipment to access the CSG local eNB according to the CSG membership status information reported by the user equipment and compares a result of the determination with the information returned by the MME, and if they are consistent, then it determines that the information returned by the MME matches successfully with the CSG membership status information reported by the user equipment; otherwise, it determines that the information returned by the MME fails to match with the CSG membership status information reported by the user equipment; and when the information returned by the MME is the CSG membership status information of the user equipment, the macro eNB compares the CSG membership status information returned by the MME with the CSG membership status information reported by the user equipment, and if they are consistent, then it determines that the information returned by the MME matches successfully with the CSG membership status information reported by the user equipment; otherwise, it determines that the information returned by the MME fails to match with the CSG membership status information reported by the user equipment.

Examples will be described below:

Example 1

The macro eNB determines that the DRB of the user equipment needs to be transferred to the CSG local eNB, upon reception of a measurement report made by the user equipment;

The macro eNB transmits the bearer transfer request which is a user plane handover message to the CSG local eNB;

The macro eNB determines that the bearer has been transferred, upon reception of a user plane handover completion message transmitted by the user equipment; the macro eNB transmits the information about the CSG identifier, and the access mode, of the CSG local eNB to the MME in a path switch request message; the macro eNB receives the information about whether to allow the user equipment to access the CSG local eNB, or the CSG membership status information of the user equipment, returned by the MME in a path switch request response message; and the macro eNB transmits the information returned by the MME to the CSG local eNB in a path switch request response message.

Example 2

The macro eNB determines that the DRB of the user equipment needs to be transferred to the CSG local eNB, upon reception of a measurement report made by the user equipment;

The macro eNB transmits the bearer transfer request which is a DRB link configuration message to the CSG local eNB; and The macro eNB determines that the bearer has been transferred, upon reception of a Radio Resource Control (RRC) connection reconfiguration completion message transmitted by the user equipment; the macro eNB transmits the information about the CSG identifier, and the access mode, of the CSG local eNB to the MME in a CSG check request message; and the macro eNB transmits the information returned by the MME to the CSG local eNB in a CSG modification message.

Example 3

The macro eNB determines that the DRB of the user equipment needs to be transferred to the CSG local eNB, upon reception of an initial context setup request transmitted by the MME in a service request procedure initiated by the user equipment;

The macro eNB transmits the bearer transfer request which is a bearer setup request message to the CSG local eNB; and The macro eNB determines that the bearer has been transferred, upon reception of an RRC connection reconfiguration completion message transmitted by the user equipment; the macro eNB transmits the information about the CSG identifier, and the access mode, of the CSG local eNB to the MME in a CSG check request message; and the macro eNB transmits the information returned by the MME to the CSG local eNB in a CSG modification message.

In another implementation, the macro eNB can determine whether to allow the user equipment to access the CSG local eNB in the operation 80 particularly as follows:

The macro eNB transmits information about a CSG identifier, and an access mode, of the CSG local eNB to an MME so that the MME determines whether to allow the user equipment to access the CSG local eNB, or obtains CSG membership status information in subscription information of the user equipment, according to the information about the CSG identifier and the access mode, and the subscription information of the user equipment;

The macro eNB receives information about whether to allow the user equipment to access the CSG local eNB, or the CSG membership status information of the user equipment, returned by the MME; and The macro eNB determines whether to allow the user equipment to access the CSG local eNB according to the information returned by the MME. Here when the information returned by the MME is the information about whether to allow the user equipment to access the CSG local eNB, then the macro eNB determines whether to allow the user equipment to access the CSG local eNB directly according to the information; and when the information returned by the MME is the CSG membership status information of the user equipment, then it determines whether the user equipment is a member of a CSG cell corresponding to the CSG local eNB according to the CSG membership status information of the user equipment, and if so, then it determines that the user equipment is allowed to access the CSG local eNB; otherwise, it determines that the user equipment is not allowed to access the CSG local eNB.

Correspondingly the macro eNB can initiate the bearer transfer procedure to the CSG local eNB in the operation 81 particularly as follows:

The macro eNB transmits to the CSG local eNB a bearer transfer request, carrying the CSG membership status information of the user equipment, returned by the MME (if the information is returned by the MME) and of course also information about a bearer of the user equipment switched to the CSG local eNB, and the CSG local eNB performs admission control on the bearer of the user equipment, and provides a QoS support mechanism for the admitted bearer, according to the CSG membership status information.

Examples will be described below:

Example 1

The macro eNB determines that the DRB of the user equipment needs to be transferred to the CSG local eNB, upon reception of a measurement report made by the user equipment;

The macro eNB transmits information about a CSG identifier, and an access mode, of the CSG local eNB to the MME in a CSG check request message; and The macro eNB transmits the bearer transfer request which is a DRB link configuration message to the CSG local eNB.

Example 2

The macro eNB determines that the DRB of the user equipment needs to be transferred to the CSG local eNB, upon reception of an initial context setup request transmitted by the MME in a service request procedure initiated by the user equipment;

The macro eNB transmits information about a CSG identifier, and an access mode, of the CSG local eNB to the MME in a CSG check request message; and The macro eNB transmits the bearer transfer request which is a bearer setup request message to the CSG local eNB.

Example 3

The macro eNB determines that the DRB of the user equipment needs to be transferred to the CSG local eNB, upon reception of an initial context setup request transmitted by the MME in a service request procedure initiated by the user equipment;

The macro eNB transmits information about a CSG identifier, and an access mode, of the CSG local eNB to the MME in an initial user equipment message; and the macro eNB receives information about whether to allow the user equipment to access the CSG local eNB, or the CSG membership status information of the user equipment, returned by the MME in an initial context setup request message; and The macro eNB transmits the bearer transfer request which is a bearer setup request message to the CSG local eNB.

Figure 9:
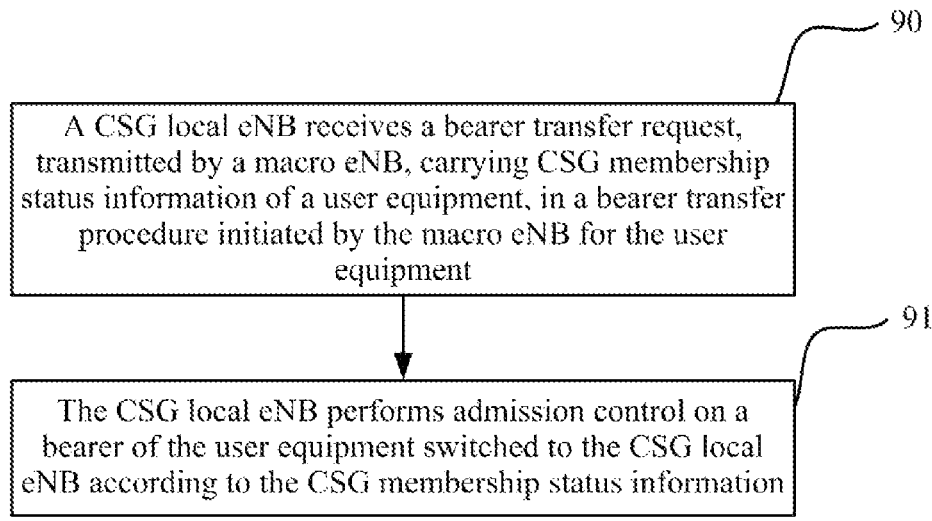
FIG. 9 illustrates a schematic flow chart of a method according to another embodiment of the invention.

Referring to FIG. 9, a method for transferring a bearer by a CSG local eNB in layered network deployment according to an embodiment of the invention includes the following operations:

Operation 90: A CSG local eNB receives a bearer transfer request, transmitted by a macro eNB, carrying CSG membership status information of a user equipment, in a bearer transfer procedure initiated by the macro eNB for the user equipment; and Operation 91: The CSG local eNB performs admission control on a bearer of the user equipment switched to the CSG local eNB according to the CSG membership status information. Here admission control on the bearer refers to a decision about whether to admit the bearer, and admission control on the bearer of the user equipment switched to the CSG local eNB can be performed under a preset rule, for example, if the CSG local eNB determines that the user equipment is a member of a CSG cell corresponding to the CSG local eNB according to the CSG membership status information, then it decides that the bearer of the user equipment switched to the CSG local eNB can be admitted; otherwise, it decides that the bearer of the user equipment switched to the CSG local eNB cannot be admitted; or if the CSG local eNB determines that the user equipment is a member of a CSG cell corresponding to the CSG local eNB according to the CSG membership status information, then it admits preferentially the bearer of the user equipment switched thereto; otherwise, it determines whether to admit the bearer of the user equipment according to remaining available resources after bearers of other user equipments switched to the CSG local eNB are admitted. When the bearer transfer request does not carry the CSG membership status information of the user equipment, the bearer of the user equipment switched to the CSG local eNB can be admitted directly.

In an implementation, the CSG local eNB receives the bearer transfer request carrying the CSG membership status information which is CSG membership status information carried in a measurement report made by the user equipment in the operation 90.

Preferably after the bearer has been transferred, the CSG local eNB receives information about whether to allow the user equipment to access the CSG local eNB, or the CSG membership status information of the user equipment, transmitted by the macro eNB; and The CSG local eNB provides a Quality of Service (QoS) support mechanism for the bearer of the user equipment switched to the CSG local eNB according to the information about whether to allow the user equipment to access the CSG local eNB, or the CSG membership status information of the user equipment. Here the QoS support mechanism is provided for the bearer by determining a QoS level to be provided for the bearer. The QoS support mechanism can be provided for the bearer of the user equipment switched to the CSG local eNB according to the information about whether to allow the user equipment to access the CSG local eNB under a preset rule, for example, if the user equipment is allowed to access the CSG local eNB, then the bearer of the user equipment switched to the CSG local eNB is provided with a QoS at a higher level, whereas if the user equipment is not allowed to access the CSG local eNB, then the bearer of the user equipment switched to the CSG local eNB is provided with a QoS at a lower level. The QoS support mechanism can be provided for the bearer of the user equipment switched to the CSG local eNB according to the CSG membership status information of the user equipment under a preset rule, for example, if it is determined according to the CSG membership status information of the user equipment that the user equipment is a member of a CSG cell corresponding to the CSG local eNB, then the bearer of the user equipment switched to the CSG local eNB is provided with a QoS at a higher level, whereas if it is determined according to the CSG membership status information of the user equipment that the user equipment is not a member of the CSG cell corresponding to the CSG local eNB, then the bearer of the user equipment switched to the CSG local eNB is provided with a QoS at a lower level.

Examples will be described below:

Example 1

The CSG local eNB receives the bearer transfer request which is a user plane handover message; and the CSG local eNB receives the information about whether to allow the user equipment to access the CSG local eNB, or the CSG membership status information of the user equipment, transmitted by the macro eNB in a path switch request response message.

Example 2

The CSG local eNB receives the bearer transfer request which is a DRB link configuration message; and the CSG local eNB receives the information about whether to allow the user equipment to access the CSG local eNB, or the CSG membership status information of the user equipment, transmitted by the macro eNB in a CSG modification message.

Example 3

The CSG local eNB receives the bearer transfer request which is a bearer setup request message; and the CSG local eNB receives the information about whether to allow the user equipment to access the CSG local eNB, or the CSG membership status information of the user equipment, transmitted by the macro eNB in a CSG modification message.

In another implementation, the CSG local eNB receives the bearer transfer request carrying the CSG membership status information which is CSG membership status information of the user equipment obtained by the macro eNB from the MME in the operation 90; and at this time the CSG local eNB provides the QoS support mechanism for the bearer of the user equipment switched to the CSG local eNB further according to the CSG membership status information of the user equipment in the operation 91. The QoS support mechanism can be provided particularly as described above, so a repeated description thereof will be omitted here.

By way of example, the CSG local eNB receives the bearer transfer request which is a DRB link configuration message or a bearer setup request message.

Figure 10:
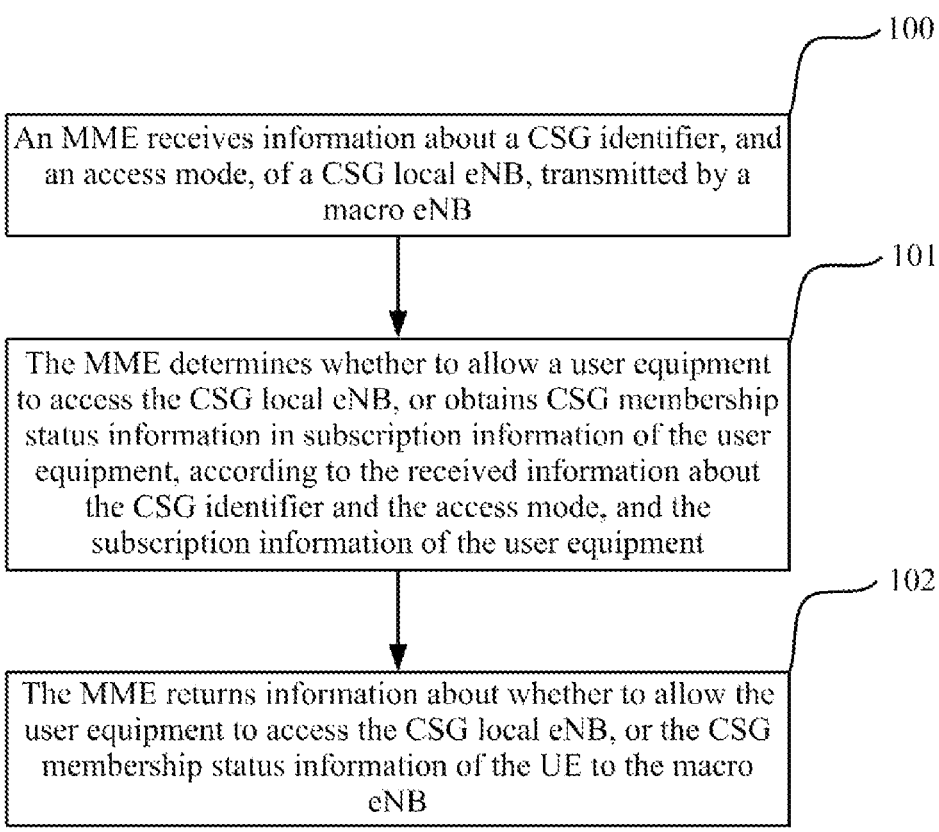
FIG. 10 illustrates a schematic flow chart of a method according to a further embodiment of the invention.

Referring to FIG. 10, a method for transferring a bearer by an MME in layered network deployment according to an embodiment of the invention includes the following operations:

Operation 100: An MME receives information about a CSG identifier, and an access mode, of a CSG local eNB, transmitted by a macro eNB; and Operation 101: The MME determines whether to allow a user equipment to access the CSG local eNB, or obtains CSG membership status information in subscription information of the user equipment, according to the received information about the CSG identifier and the access mode, and the subscription information of the user equipment; and here if the access mode of the CSG local eNB is a closed access mode, then the MME determines whether to allow the user equipment to access the CSG local eNB according to the received information about the CSG identifier and the access mode, and the subscription information of the user equipment, and if the access mode of the CSG local eNB is a hybrid access mode, then the MME obtains the CSG membership status information in the subscription information of the user equipment. The MME can determine whether to allow the user equipment to access the CSG local eNB according to the received information about the CSG identifier and the access mode, and the subscription information of the user equipment as follows: the MME determines whether the user equipment is a member of a CSG cell corresponding to the CSG local eNB according to the CSG identifier of the CSG local eNB, and the CSG membership status information in the subscription information of the user equipment, and if so, then it determines that the user equipment is allowed to access the CSG local eNB; otherwise, it determines that the user equipment is not allowed to access the CSG local eNB.

Operation 102: The MME returns information about whether to allow the user equipment to access the CSG local eNB, or the CSG membership status information of the user equipment to the macro eNB.

Examples will be described below:

Example 1

The MME receives the information about the CSG identifier, and the access mode, of the CSG local eNB transmitted by the macro eNB in a path switch request message; and the MME returns the information about whether to allow the user equipment to access the CSG local eNB, or the CSG membership status information of the user equipment to the macro eNB in a path switch request response message.

Example 2

The MME receives the information about the CSG identifier, and the access mode, of the CSG local eNB transmitted by the macro eNB in a CSG check request message.

Example 3

The MME receives the information about the CSG identifier, and the access mode, of the CSG local eNB transmitted by the macro eNB in an initial user equipment message; and the MME returns the information about whether to allow the user equipment to access the CSG local eNB, or the CSG membership status information of the user equipment to the macro eNB in an initial context setup request message.

The invention will be described below in particular embodiments:

First Embodiment

Figure 11A:
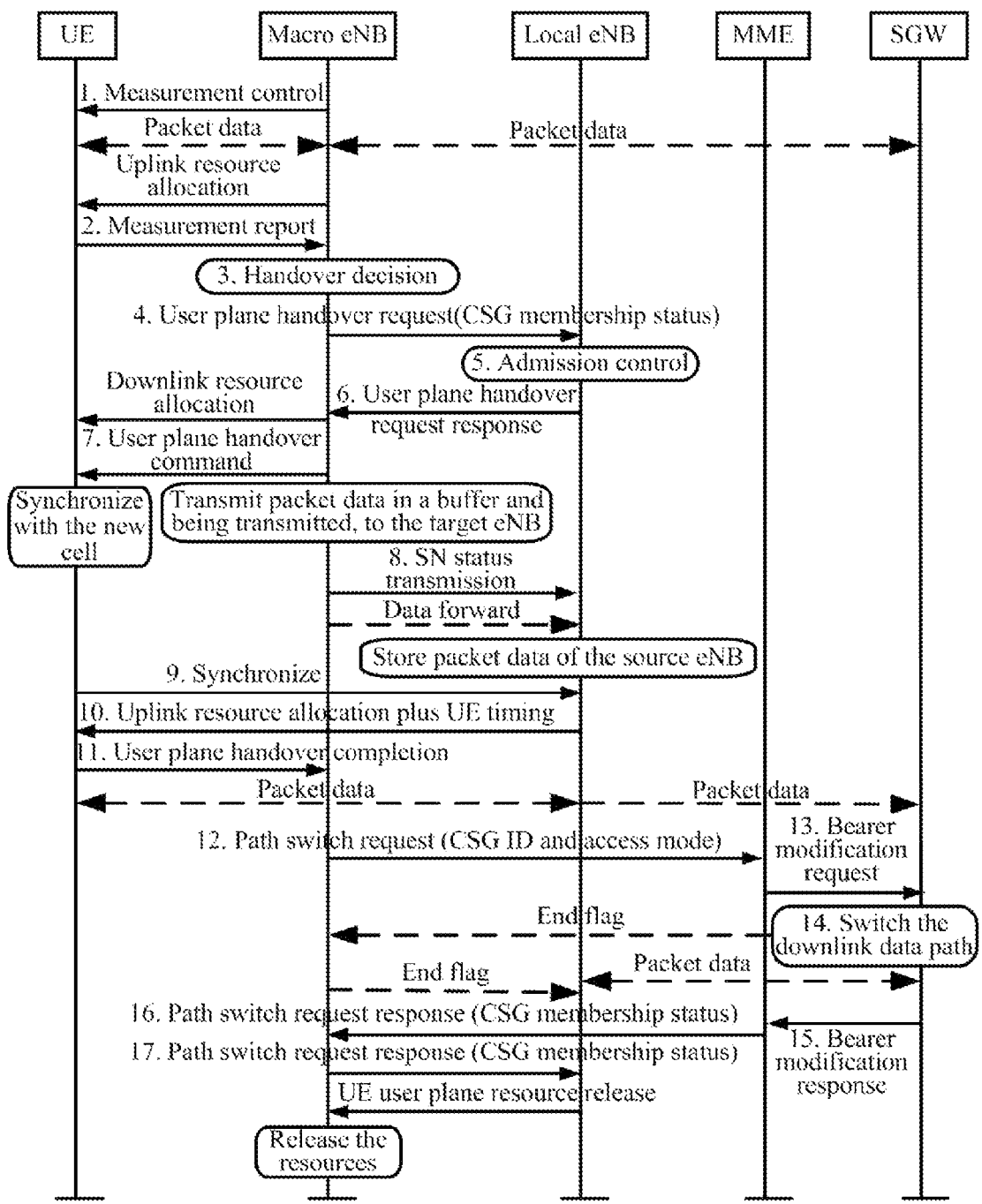
FIG. 11a illustrates a schematic flow chart according to a first embodiment of the invention.

In the two architectures as illustrated in FIG. 5a and FIG. 5, when the UE enters an area covered by both the macro eNB and the CSG local eNB, all or a part of DRBs of the UE are switched to the local eNB while SRBs remain active at the macro eNB in a path switch procedure. FIG. 11a illustrates a possible handover process of the user plane as follows:

Operation 1. The macro eNB configures the UE to make measurement, and subsequently the UE makes measurement according to received measurement configuration information;

Operation 2. The UE makes a measurement report over an uplink resource allocated by the macro eNB for the UE, to assist the macro eNB in making a handover decision;

Operation 3. The Macro eNB decides to transfer a bearer according to the measurement report of the UE, information about the bearer of the UE, a moving speed of the UE, load information, an operator strategy and other information. If the bearer is going to be transferred to a target eNB which is the CSG local eNB, then the macro eNB firstly determines whether a bearer transfer procedure can be initiated, according to CSG membership status information reported by the UE. If the UE is allowed to access the CSG local eNB, then the macro eNB can initiate a bearer transfer procedure;

Operation 4. The macro eNB transmits a user plane handover request message carrying the CSG membership status information reported by the UE, to the CSG local eNB;

Operation 5. The CSG local eNB performs admission control on the bearer of the UE according to the CSG membership status information;

Operation 6. The CSG local eNB returns a handover request response message including an RRC container, which is particularly a handover command to trigger the handover of the UE, to the macro eNB;

Operation 7. The macro eNB transmits the received handover command transparently (without any modification thereto) to the UE over a scheduled downlink resource; and the UE stops data from being transmitted and received with the macro eNB upon reception of the handover command;

Operation 8. The macro eNB transmits sequence number state information of ongoing data transmission (e.g., a sequence number of an unsuccessfully transmitted downlink data packet, a first sequence number which can be allocated by the CSG local eNB, etc.) to the CSG local eNB; and the sequence number state information is transmitted so that sequence numbers of data transmitted and received by the macro eNB and the CSG local eNB are consecutive to thereby avoid any packet from being lost or retransmitted;

Operation 9. The UE transmits a preamble to the CSG local eNB for uplink synchronization with the CSG local eNB;

Operation 10. The CSG local eNB returns a response message carrying an uplink resource allocated for the UE (for subsequent transmission) and a timing advance of the UE (to adjust an uplink transmission instance of time of the UE for uplink synchronization);

Operation 11. The UE returns a handover completion message to the macro eNB;

Thereafter data can be transmitted and received between the UE and the CSG local eNB.

Operation 12. The macro eNB transmits a path switch request message carrying information about a CSG ID, and an access mode, of the CSG local eNB to the MME;

Operation 13. The MME transmits to the SGW a bearer modification request carrying user plane transport layer addresses (IP addresses) and downlink GTP tunnel identifiers (TEIDs) specified by the CSG local eNB respectively for respective EPS bearers of the UE;

Operation 14. The SGW switches the path;

Operation 15. The SGW returns to the MME a bearer modification response carrying user plane transport layer addresses (IP addresses) and uplink GTP tunnel identifiers (TEIDs) specified by the SGW respectively for the respective EPS bearers of the UE;

Operation 16. After the SGW switches the path, the MME transmits a path switch request response to the macro eNB. Particularly the MME returns information about whether UE can access the target CSG local eNB, or the CSG membership status information of the UE, in the path switch request response, according to CSG subscription information of the UE, and the information about the CSG ID, and the access mode, of the CSG local eNB previously reported by the macro eNB; and Operation 17. The macro eNB forwards to the local eNB the received path switch request response carrying the information about whether UE can access the target CSG local eNB, or the CSG membership status information of the UE; and the CSG local eNB provides a corresponding QoS support mechanism for the bearer of the UE switched to the CSG local eNB according to the information. In another possible implementation, the macro eNB can compare the CSG membership status information reported by the UE with the information returned by the MME for matching, and if they match, then it will not carry the information returned by the MME in the path switch request response; otherwise, it will carry the information returned by the MME in the path switch request response. If the path switch request response carries information that the UE cannot access the target CSG local eNB, then the entire flow ends.

Second Embodiment

Figure 11B:
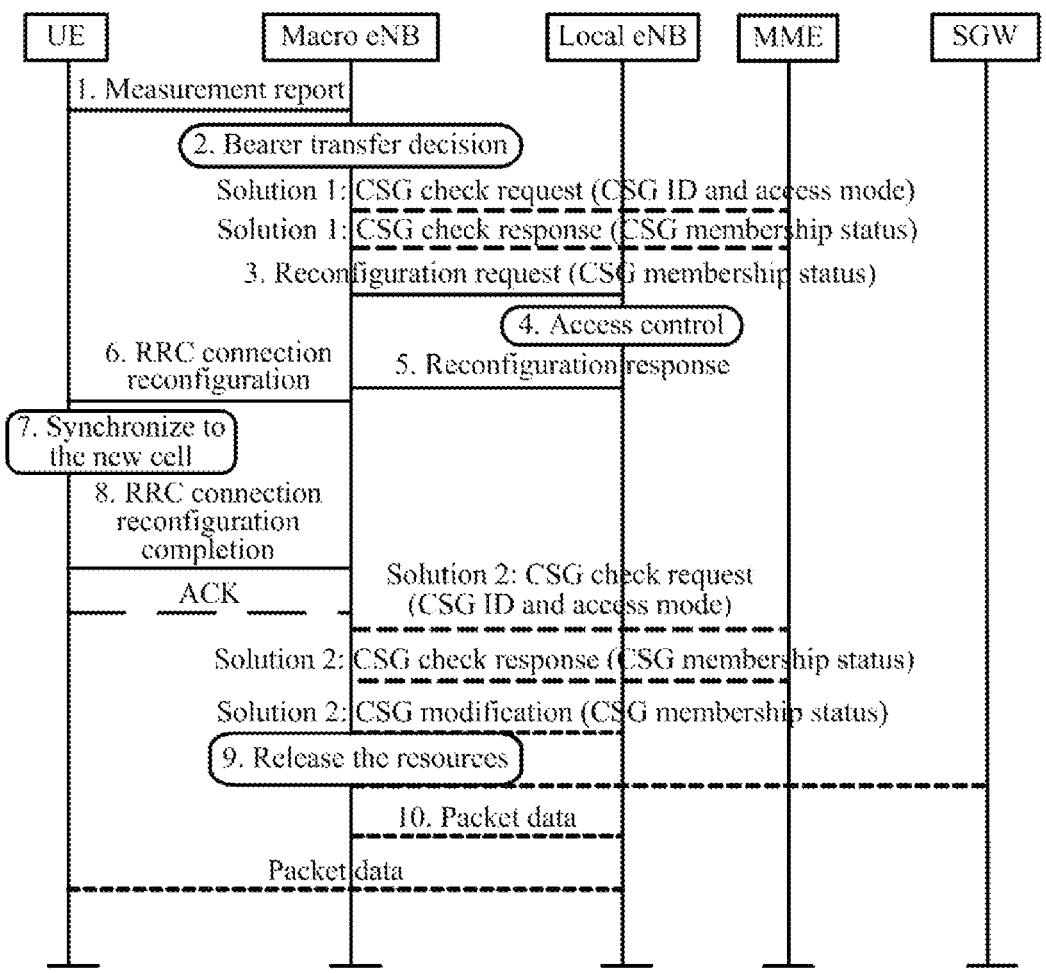
FIG. 11b illustrates a schematic flow chart according to a second embodiment of the invention.

In the architectures as illustrated in FIG. 7, the UE is currently connected only with the macro eNB, and all or a part of DRBs of the UE need to be transferred from the macro eNB to the CSG local eNB. FIG. 11b illustrates a possible handover process of the user plane as follows:

First Solution:

The macro eNB decides to transfer a bearer according to a measurement report of the UE, information about the bearer of the UE, a moving speed of the UE, load information, an operator strategy and other information. If the bearer is going to be transferred to a target eNB which is the CSG local eNB, then after the operation 2, the macro eNB requests the MME to determine whether the UE can access the CSG local eNB, or requests the MME for CSG membership status information of the UE, in a new CSG check procedure. If the MME returns such a CSG check result that the UE is allowed to access the CSG local eNB, then the macro eNB will initiate a bearer transfer procedure. Here the macro eNB can transmit information about a plurality of CSG local eNBs to the MME in the CSG check procedure, and accordingly the MME may also return the CSG check result for the plurality of CSG local eNBs.

Operation 1. The UE makes a measurement report.

Operation 2. The macro eNB decides to transfer a bearer according to the measurement report of the UE, information about the bearer of the UE, a moving speed of the UE, load information, an operator strategy and other information. If the bearer is going to be transferred to a target eNB which is the CSG local eNB, then after the operation 2, the eNB transmits to the MME a CSG check request message carrying a CSG ID, and an access mode, of the CSG local eNB, to request the MME to determine whether the UE can access the CSG local eNB or to request the MME for CSG membership status information of the UE. The MME returns information about whether the UE can access the target CSG local eNB, or the CSG membership status information of the UE according to CSG subscription information of the UE, and information about a CSG ID, and an access mode, of the CSG local eNB previously reported by the macro eNB. If the macro eNB determines from the information returned by the MME that the UE is allowed to access the CSG local eNB, then it initiates a bearer transfer procedure;

Operation 3. The macro eNB transmits a DRB link configuration message carrying the CSG membership status information of the UE returned by the MME, to the CSG local eNB;

Operation 4. The CSG local eNB performs admission control on the bearer of the UE, and provides a corresponding QoS support mechanism for the bearer of the UE switched to the CSG local eNB, according to the CSG membership status information of the UE.

Operation 5. The local eNB notifies the macro eNB about completed configuration;

Operation 6. The macro eNB instructs the UE in an RRC connection reconfiguration message to reconfigure the DRB to be consistent in configuration with the local eNB; and upon reception of the RRC connection reconfiguration message, the UE identifies from the content of the message the operation of separating the control plane from the user plane and thereafter activates another set of PHY layer and MAC layer entities dedicated to the DRB;

Operation 7. The UE is synchronized to a new access point;

Operation 8. The UE returns a reconfiguration completion message to the macro eNB and also reconfigures a new DRB link and releases the original DRB link;

Operation 9. The macro eNB maps a PDCP entity of the DRB to RLC and MAC entities of the local eNB and also releases the original DRB link; and Operation 10. The local eNB transmits new downlink data to the UE.

Second Solution:

The macro eNB decides to transfer a bearer according to a measurement report of the UE, information about the bearer of the UE, a moving speed of the UE, load information, an operator strategy and other information. If the bearer is going to be transferred to a target eNB which is the CSG local eNB, then the macro eNB firstly determines whether a bearer transfer procedure can be initiated, according to CSG membership status information reported by the UE. If the UE is allowed to access the CSG local eNB, then the macro eNB initiates a bearer transfer procedure. After the bearer transfer procedure is performed, the macro eNB further initiates a new CSG check procedure, to request the MME to determine whether the UE can access the CSG local eNB or to request the MME for CSG membership status information of the UE. After information returned by the MME is obtained, the macro eNB initiates a CSG modification procedure to the CSG local eNB, to forward the information returned by the MME to the CSG local eNB.

Operation 1. The UE makes a measurement report;

Operation 2. The macro eNB decides to transfer a bearer according to the measurement report of the UE, information about the bearer of the UE, a moving speed of the UE, load information, an operator strategy and other information;

Operation 3. The macro eNB determines whether a bearer transfer procedure can be initiated, according to CSG membership status information reported by the UE. If the UE is allowed to access the CSG local eNB, then the macro eNB transmits a DRB link configuration message carrying the CSG membership status information reported by the UE, to the CSG local eNB;

Operation 4. The CSG local eNB performs admission control on the bearer of the UE according to the CSG membership status information of the UE;

Operation 5. The local eNB notifies the macro eNB about completed configuration;

Operation 6. The macro eNB instructs the UE in an RRC connection reconfiguration message to reconfigure the DRB to be consistent in configuration with the local eNB; and upon reception of the RRC connection reconfiguration message, the UE identifies from the content of the message the operation of separating the control plane from the user plane and thereafter activates another set of PHY layer and MAC layer entities dedicated to the DRB;

Operation 7. The UE is synchronized to a new access point;

Operation 8. The UE returns a reconfiguration completion message to the macro eNB and also reconfigures a new DRB link and releases the original DRB link;

After the operation 8, the macro eNB transmits a CSG check request message carrying a CSG ID, and an access mode, of the CSG local eNB to the MME, to request the MME to determine whether the UE can access the CSG local eNB or to request the MME for CSG membership status information of the UE. The MME returns information about whether the UE can access the target CSG local eNB, or the CSG membership status information of the UE, according to CSG subscription information of the UE, and information about the CSG ID, and the access mode, of the CSG local eNB previously reported by the macro eNB.

The macro eNB further initiates a CSG modification procedure to the CSG local eNB and forwards the information returned by the MME to the CSG local eNB in the CSG modification procedure. The CSG local eNB provides a corresponding QoS support mechanism for the bearer of the UE switched to the CSG local eNB according to the information. In another possible implementation, the macro eNB can compare the CSG membership status information reported by the UE with the information returned by the MME for matching, and if they match, then it will not initiate any CSG modification procedure; otherwise, it will initiate a CSG modification procedure;

Operation 9. The macro eNB maps a PDCP entity of the DRB to RLC and MAC entities of the local eNB and also releases the original DRB link; and Operation 10. The local eNB transmits new downlink data to the UE.

Third Embodiment

In the architectures as illustrated in FIG. 5a, FIG. 6 and FIG. 7, the UE moves from the local eNB 1 to the CSG local eNB 2, and the macro eNB needs to transfer user plane bearers of the UE from the local eNB1 to the CSG local eNB 2. The local eNB 1 can also be a CSG local eNB.

When the local eNB 1 is a CSG local eNB, the flow charts in the architectures as illustrated in FIG. 5a and FIG. 6 are substantially the same as the flow chart in the first embodiment in that the macro eNB switches all or a part of DRBs of the UE to the CSG local eNB 2 in a path switch procedure except that the macro eNB needs to instruct the local eNB 1 to release the old DRB configuration, upon reception of the handover completion message from the UE.

The flow chart in the architecture as illustrated in FIG. 7 is substantially the same as the flow chart in the second embodiment in that the macro eNB may instruct the CSG local eNB 2 to operate for reconfiguration after deciding to hand over the access point of the user plane except that the macro eNB needs to instruct the local eNB 1 to release the old DRB configuration, upon reception of the RRC connection reconfiguration completion message from the UE.

Fourth Embodiment

Figure 11C:
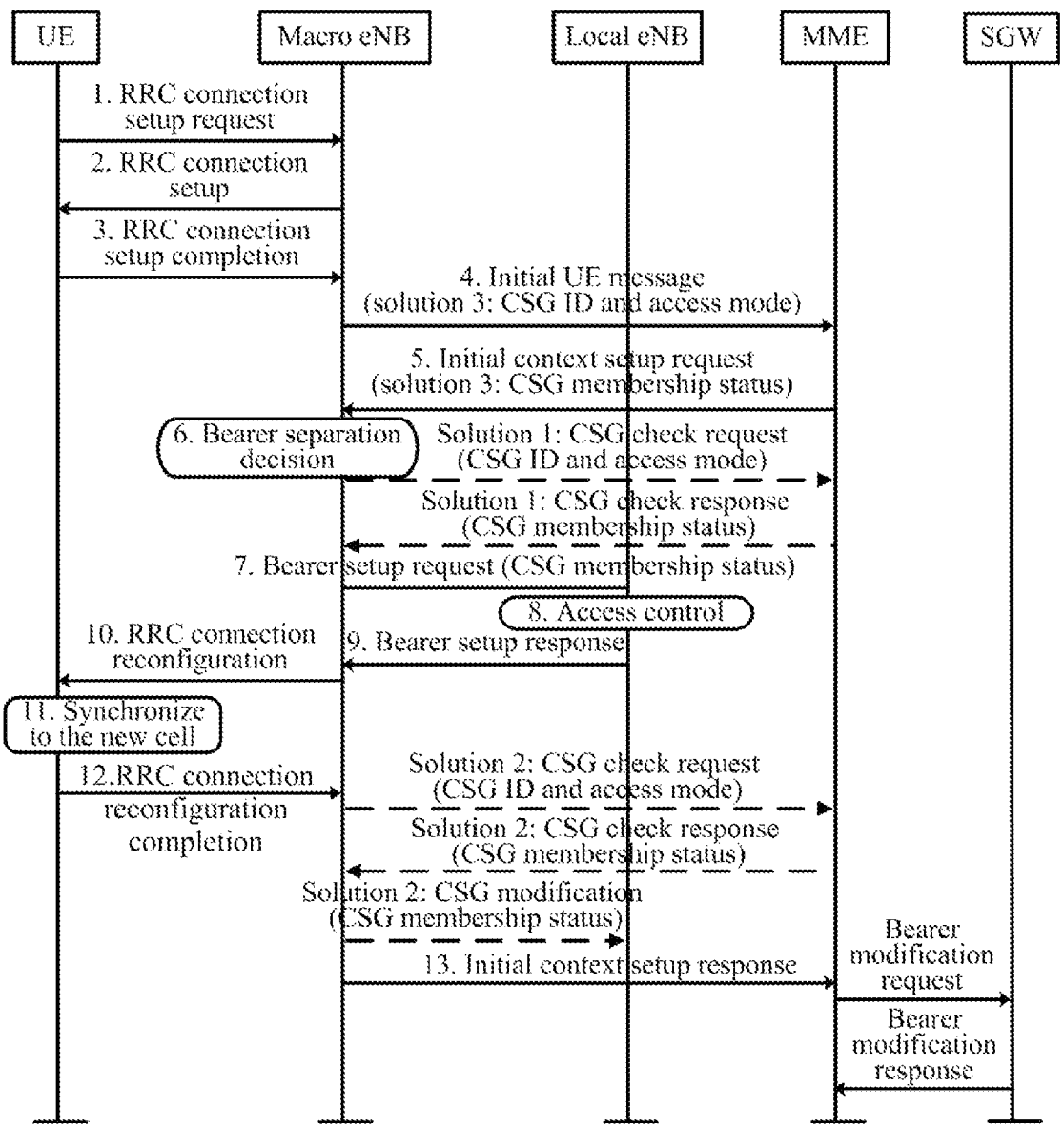
FIG. 11c illustrates a schematic flow chart according to a fourth embodiment of the invention.

In the architectures as illustrated in FIG. 5a, FIG. 6 and FIG. 7, when the UE initiates a service request in an area covered by both the macro eNB and the CSG local eNB, a possible process of requesting for an LTE service is illustrated in FIG. 11c, and the macro eNB can separate the user plane from the control plane of the UE while the UE is requesting for a service:

There are three possible implementation solutions:
First Solution:

It is similar to the first solution in the second embodiment:

Operations 1 to 3. The UE initiates an RRC connection setup procedure to the macro eNB;

Operation 4. After an RRC connection is set up, the macro eNB initiates an S1 signaling bearer setup procedure to the MME by transmitting S1 signaling which is an initial UE message carrying a Non Access Stratum (NAS) service request message;

Operation 5. The MME triggers an initial context setup procedure of the UE, upon reception of the initial UE message, by transmitting an initial context setup request message carrying information about an E-RAB to be set up, e.g., QoS information, a transport layer address, etc.;

Operation 6. The macro eNB decides to separate the bearer.

After the operation 6, the macro eNB requests the MME to determine whether the UE can access the CSG local eNB, or to request the MME for CSG membership status information of the UE, in a new procedure, i.e., CSG check procedure. If the macro eNB determines from information returned by the MME that the UE is allowed to access the CSG local eNB, then it can initiate a bearer transfer procedure. Here the macro eNB can transmit information about a plurality of CSG local eNBs to the MME in the CSG check procedure, and accordingly the MME may also return the CSG check result for the plurality of CSG local eNBs. Thereafter the flow proceeds to the operation 7;

Operation 7. The macro eNB transmits a bearer setup request message carrying the CSG membership status information returned by the MME, to the CSG local eNB;

Operation 8. The CSG local eNB performs admission control on the bearer of the UE, and sets up the corresponding bearer, according to the CSG membership status information in the bearer setup request message upon reception of the bearer setup request message;

Operation 9. The macro eNB generates an RRC connection reconfiguration message including information about the newly set up DRB (including all of DRBs set up at the macro eNB and the local eNB) upon reception of a bearer setup response message;

Operation 10. The macro eNB transmits the RRC connection reconfiguration message to the UE;

Operation 11. When the UE receives the RRC connection reconfiguration message from the macro eNB and the message explicitly or implicitly indicates that the control plane needs to be separated from the user plane, the UE is firstly triggered to operate for uplink and downlink synchronization with the local eNB;

Operation 12. The UE returns an RRC reconfiguration completion message to the macro eNB upon successful synchronization; and Operation 13. The macro eNB responds with an initial context setup response message carrying TEIDs/transport layer addresses corresponding to respective EPS's upon reception of the RRC reconfiguration completion message.

Second Solution:

It is similar to the second solution in the second embodiment:

Operations 1 to 3. The UE initiates an RRC connection setup procedure to the macro eNB;

Operation 4. After an RRC connection is set up, the macro eNB initiates an S1 signaling bearer setup procedure to the MME by transmitting S1 signaling which is an initial UE message carrying an NAS service request message;

Operation 5. The MME triggers an initial context setup procedure of the UE, upon reception of the initial UE message, by transmitting an initial context setup request message carrying information about an E-RAB to be set up, e.g., QoS information, a transport layer address, etc.;

Operation 6. The macro eNB decides to separate the bearer.

After the operation 6, the macro eNB firstly determines whether a bearer transfer procedure can be initiated, according to CSG membership status information in a measurement report made by the UE. If the UE is allowed to access the CSG local eNB, then the macro eNB imitates a bearer transfer procedure and proceeds to the operation 7;

Operation 7. The macro eNB transmits a bearer setup request message carrying the CSG membership status information reported by the UE, to the CSG local eNB;

Operation 8. The CSG local eNB performs admission control on the bearer of the UE, and sets up the corresponding bearer, according to the CSG membership status information upon reception of the bearer setup request message;

Operation 9. The macro eNB generates an RRC connection reconfiguration message including information about the newly set up DRB (including all of DRBs set up at the macro eNB and the local eNB) upon reception of a bearer setup response message;

Operation 10. The macro eNB transmits the RRC connection reconfiguration message to the UE;

Operation 11. When the UE receives the RRC connection reconfiguration message from the macro eNB and the message explicitly or implicitly indicates that the control plane needs to separated from the user plane, the UE is firstly triggered to operate for uplink and downlink synchronization with the local eNB;

Operation 12. The UE returns an RRC reconfiguration completion message to the macro eNB upon successful synchronization.

After the bearer transfer procedure is completed, that is, after the operation 12, the eNB further requests the MME to determine whether the UE can access the CSG local eNB, or to request the MME for CSG membership status information of the UE, in a new procedure, i.e., CSG check procedure.

After information returned by the MME is obtained, the macro eNB further initiates a CSG modification procedure to the CSG local eNB to forward the information returned by the MME to the CSG local eNB. The CSG local eNB provides a corresponding QoS support mechanism for the bearer of the UE switched to the CSG local eNB according to the information. In another possible implementation, the macro eNB can compare the CSG membership status information reported by the UE with the information returned by the MME for matching, and if they match, then it will not initiate any CSG modification procedure; otherwise, it will initiate a CSG modification procedure; and Operation 13. The macro eNB responds with an initial context setup response message carrying TEIDs/transport layer addresses corresponding to respective EPS's upon reception of the RRC reconfiguration completion message.

Third Solution:

Operations 1 to 3. The UE initiates an RRC connection setup procedure to the macro eNB;

Operation 4. The macro eNB transmits an initial UE message carrying information about a CSG ID, and an access mode, of the CSG local eNB to the MME. Here the message can carry information about CSG IDs, and access modes, of a plurality of CSG local eNBs;

Operation 5. The MME transmits an initial context setup request message. Particularly the MME returns information about whether UE can access the target CSG local eNB, or CSG membership status information of the UE, in the initial context setup request message, according to CSG subscription information of the UE, and the information about the CSG ID, and the access mode, of the CSG local eNB previously reported by the macro eNB. If the macro eNB carries the information about a plurality of CSG local eNBs in the initial UE message, then accordingly the MME may also return the information about whether the UE can access the respective target CSG local eNBs, or the CSG membership status information of the UE;

Operation 6. The macro eNB decides to separate a bearer;

Operation 7. If the macro eNB determines from the information returned by the MME that the UE is allowed to access the CSG local eNB, then the macro eNB initiates a bearer transfer procedure, and the macro eNB transmits a bearer setup request message carrying the CSG membership status information returned by the MME to the CSG local eNB;

Operation 8. The CSG local eNB performs admission control on the bearer of the UE, and sets up the corresponding bearer, according to the CSG membership status information in the bearer setup request message upon reception of the bearer setup request message;

Operation 9. The macro eNB generates an RRC connection reconfiguration message including information about the newly set up DRB (including all of DRBs set up at the macro eNB and the local eNB) upon reception of a bearer setup response message;

Operation 10. The macro eNB transmits the RRC connection reconfiguration message to the UE;

Operation 11. When the UE receives the RRC connection reconfiguration message from the macro eNB and the message explicitly or implicitly indicates that the control plane needs to be separated from the user plane, the UE is firstly triggered to operate for uplink and downlink synchronization with the local eNB;

Operation 12. The UE returns an RRC reconfiguration completion message to the macro eNB upon successful synchronization; and Operation 13. The macro eNB responds with an initial context setup response message carrying TEIDs/transport layer addresses corresponding to respective EPS's upon reception of the RRC reconfiguration completion message.

Figure 12:
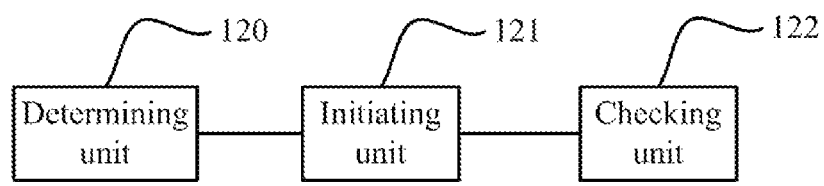
FIG. 12 illustrates a schematic structural diagram of a macro eNB according to an embodiment of the invention.

Referring to FIG. 12, an embodiment of the invention provides a macro eNB including:

A determining unit 120 is configured to determine whether to allow a user equipment to access a Closed Subscriber Group (CSG) local eNB upon determining that a Data Radio Bearer (DRB) of the user equipment needs to be transferred to the CSG local eNB; and An initiating unit 121 is configured to initiate a bearer transfer procedure to the CSG local eNB upon determining that the user equipment is allowed to access the CSG local eNB.

Furthermore the determining unit 120 is configured:

To determine whether to allow the user equipment to access the CSG local eNB according to CSG membership status information carried in a measurement report made by the user equipment.

Furthermore the initiating unit 121 is configured:

To transmit a bearer transfer request carrying the CSG membership status information reported by the user equipment to the CSG local eNB so that the CSG local eNB performs admission control on the bearer of the user equipment according to the CSG membership status information.

Furthermore the macro eNB further includes:

A checking unit 122 is configured to transmit information about a CSG identifier, and an access mode, of the CSG local eNB to a Mobility Management Entity (MME) upon determining that the bearer has been transferred, so that the MME determines whether to allow the user equipment to access the CSG local eNB, or obtains CSG membership status information in subscription information of the user equipment, according to the information about the CSG identifier and the access mode, and the subscription information of the user equipment;

To receive information about whether to allow the user equipment to access the CSG local eNB, or the CSG membership status information of the user equipment, returned by the MME; and To transmit the information returned by the MME to the CSG local eNB so that the CSG local eNB provides a QoS support mechanism for the bearer of the user equipment switched to the CSG local eNB according to the information returned by the MME; or to match the information returned by the MME with the CSG membership status information reported by the user equipment, and if they match successfully, not to transmit the information returned by the MME to the CSG local eNB; otherwise, to transmit the information returned by the MME to the CSG local eNB so that the CSG local eNB provides a QoS support mechanism for the bearer of the user equipment switched to the CSG local eNB according to the information returned by the MME.

Furthermore the determining unit 120 is configured to determine that the DRB of the user equipment needs to be transferred to the CSG local eNB, upon reception of the measurement report made by the user equipment;

The initiating unit 121 is configured to transmit the bearer transfer request which is a user plane handover message; and The checking unit 122 is configured to determine that the bearer has been transferred, upon reception of a user plane handover completion message transmitted by the user equipment; to transmit the information about the CSG identifier, and the access mode, of the CSG local eNB to the MME in a path switch request message; to receive the information about whether to allow the user equipment to access the CSG local eNB, or the CSG membership status information of the user equipment, returned by the MME in a path switch request response message; and to transmit the information returned by the MME to the CSG local eNB in a path switch request response message.

Furthermore the determining unit 120 is configured to determine that the DRB of the user equipment needs to be transferred to the CSG local eNB, upon reception of the measurement report made by the user equipment;

The initiating unit 121 is configured to transmit the bearer transfer request which is a DRB link configuration message; and The checking unit 122 is configured to determine that the bearer has been transferred, upon reception of a Radio Resource Control (RRC) connection reconfiguration completion message transmitted by the user equipment; to transmit the information about the CSG identifier, and the access mode, of the CSG local eNB to the MME in a CSG check request message; and to transmit the information returned by the MME to the CSG local eNB in a CSG modification message.

Furthermore the determining unit 120 is configured to determine that the DRB of the user equipment needs to be transferred to the CSG local eNB, upon reception of an initial context setup request transmitted by the MME in a service request procedure initiated by the user equipment;

The initiating unit 121 is configured to transmit the bearer transfer request which is a bearer setup request message; and The checking unit 122 is configured to determine that the bearer has been transferred, upon reception of an RRC connection reconfiguration completion message transmitted by the user equipment; to transmit the information about the CSG identifier, and the access mode, of the CSG local eNB to the MME in a CSG check request message; and to transmit the information returned by the MME to the CSG local eNB in a CSG modification message.

Furthermore the determining unit 120 is configured:

To transmit information about a CSG identifier, and an access mode, of the CSG local eNB to an MME so that the MME determines whether to allow the user equipment to access the CSG local eNB, or obtains CSG membership status information in subscription information of the user equipment, according to the information about the CSG identifier and the access mode, and the subscription information of the user equipment;

To receive information about whether to allow the user equipment to access the CSG local eNB, or the CSG membership status information of the user equipment, returned by the MME; and To determine whether to allow the user equipment to access the CSG local eNB according to the information returned by the MME.

Furthermore the initiating unit 121 is configured:

To transmit a bearer transfer request, carrying the CSG membership status information of the user equipment, returned by the MME to the CSG local eNB so that the CSG local eNB performs admission control on the bearer of the user equipment, and provides a QoS support mechanism for the admitted bearer, according to the CSG membership status information.

Furthermore the determining unit 120 is configured:

To determine that the DRB of the user equipment needs to be transferred to the CSG local eNB, upon reception of a measurement report made by the user equipment; and To transmit information about a CSG identifier, and an access mode, of the CSG local eNB to the MME in a CSG check request message; and The initiating unit 121 is configured to transmit the bearer transfer request which is a DRB link configuration message.

Furthermore the determining unit 120 is configured:

To determine that the DRB of the user equipment needs to be transferred to the CSG local eNB, upon reception of an initial context setup request transmitted by the MME in a service request procedure initiated by the user equipment; and To transmit information about a CSG identifier, and an access mode, of the CSG local eNB to the MME in a CSG check request message; and The initiating unit 121 is configured to transmit the bearer transfer request which is a bearer setup request message.

Furthermore the determining unit 120 is configured:

To determine that the DRB of the user equipment needs to be transferred to the CSG local eNB, upon reception of an initial context setup request transmitted by the MME in a service request procedure initiated by the user equipment; and To transmit information about a CSG identifier, and an access mode, of the CSG local eNB to the MME in an initial user equipment message; and to receive the information about whether to allow the user equipment to access the CSG local eNB, or the CSG membership status information of the user equipment, returned by the MME in an initial context setup request message; and The initiating unit 121 is configured to transmit the bearer transfer request which is a bearer setup request message.

An embodiment of the invention provides a macro eNB including a processor and a data reception and transmission interface, where:

The processor is configured to determine whether to allow a user equipment to access a Closed Subscriber Group (CSG) local eNB upon determining that a Data Radio Bearer (DRB) of the user equipment needs to be transferred to the CSG local eNB; and to initiate a bearer transfer procedure to the CSG local eNB upon determining that the user equipment is allowed to access the CSG local eNB; and The data reception and transmission interface is configured to communicate data between the processor and the CSG local eNB.

Figure 13:
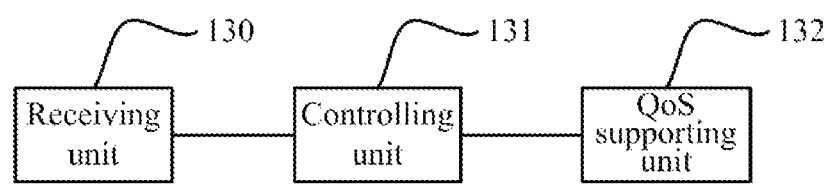
FIG. 13 illustrates a schematic structural diagram of a closed subscriber group local eNB according to an embodiment of the invention.

Referring to FIG. 13, an embodiment of the invention provides a Closed Subscriber Group (CSG) local eNB including:

A receiving unit 130 is configured to receive a bearer transfer request, transmitted by a macro eNB, carrying CSG membership status information of a user equipment, in a bearer transfer procedure initiated by the macro eNB for the user equipment; and A controlling unit 131 is configured to perform admission control on a bearer of the user equipment according to the CSG membership status information.

Furthermore the receiving unit 130 is configured to receive the bearer transfer request carrying the CSG membership status information which is CSG membership status information carried in a measurement report made by the user equipment.

Furthermore the CSG local eNB further includes:

A QoS supporting unit 132 is configured, after the bearer has been transferred, for the CSG local eNB to receive information about whether to allow the user equipment to access the CSG local eNB, or the CSG membership status information of the user equipment, transmitted by the macro eNB; and To provide a QoS support mechanism for the bearer of the user equipment switched to the CSG local eNB according to the information about whether to allow the user equipment to access the CSG local eNB, or the CSG membership status information of the user equipment.

Furthermore the receiving unit 130 is configured to receive the bearer transfer request which is a user plane handover message; and the QoS supporting unit 132 is configured to receive the information about whether to allow the user equipment to access the CSG local eNB, or the CSG membership status information of the user equipment, transmitted by the macro eNB in a path switch request response message; or The receiving unit 130 is configured to receive the bearer transfer request which is a DRB link configuration message; and the QoS supporting unit 132 is configured to receive the information about whether to allow the user equipment to access the CSG local eNB, or the CSG membership status information of the user equipment, transmitted by the macro eNB in a CSG modification message; or The receiving unit 130 is configured to receive the bearer transfer request which is a bearer setup request message; and the QoS supporting unit 132 is configured to receive the information about whether to allow the user equipment to access the CSG local eNB, or the CSG membership status information of the user equipment, transmitted by the macro eNB in a CSG modification message.

Furthermore the receiving unit 130 is configured to receive the bearer transfer request carrying the CSG membership status information which is CSG membership status information of the user equipment obtained by the macro eNB from the MME; and The controlling unit 131 is configured to provide a QoS support mechanism for the bearer of the user equipment switched to the CSG local eNB according to the CSG membership status information.

Furthermore the receiving unit 130 is configured to receive the bearer transfer request which is a DRB link configuration message; or The receiving unit 130 is configured to receive the bearer transfer request which is a bearer setup request message.

An embodiment of the invention provides a Closed Subscriber Group (CSG) local eNB including a processor and a data reception and transmission interface, where:

The processor is configured to receive a bearer transfer request, transmitted by a macro eNB, carrying CSG membership status information of a user equipment, in a bearer transfer procedure initiated by the macro eNB for the user equipment; and to perform admission control on a bearer of the user equipment according to the CSG membership status information; and The data reception and transmission interface is configured to communicate data between the processor and the macro eNB, and between the processor and the user equipment.

Figure 14:
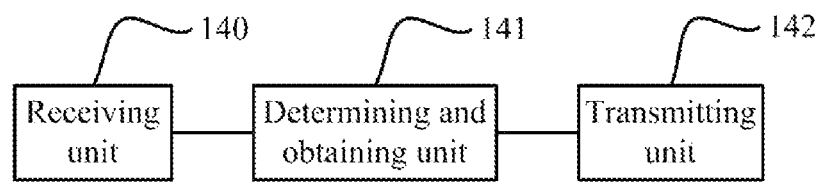
FIG. 14 illustrates a schematic structural diagram of an MME according to an embodiment of the invention.

Referring to FIG. 14, an embodiment of the invention provides a mobility management entity including:

A receiving unit 140 is configured to receive information about a CSG identifier, and an access mode, of a CSG local eNB, transmitted by a macro eNB;

A determining and obtaining unit 141 is configured to determine whether to allow the user equipment to access the CSG local eNB, or to obtain CSG membership status information in subscription information of the user equipment, according to the information about the CSG identifier and the access mode, and the subscription information of the user equipment; and A transmitting unit 142 is configured to return information about whether to allow the user equipment to access the CSG local eNB, or the CSG membership status information of the user equipment, to the macro eNB.

Furthermore the receiving unit 140 is configured to receive the information about the CSG identifier, and the access mode, of the CSG local eNB transmitted by the macro eNB in a path switch request message; and the transmitting unit 142 is configured to return the information about whether to allow the user equipment to access the CSG local eNB, or the CSG membership status information of the user equipment to the macro eNB in a path switch request response message; or The receiving unit 140 is configured to receive the information about the CSG identifier, and the access mode, of the CSG local eNB transmitted by the macro eNB in a CSG check request message; or The receiving unit 140 is configured to receive the information about the CSG identifier, and the access mode, of the CSG local eNB transmitted by the macro eNB in an initial user equipment message; and the transmitting unit 142 is configured to return the information about whether to allow the user equipment to access the CSG local eNB, or the CSG membership status information of the user equipment to the macro eNB in an initial context setup request message.

An embodiment of the invention provides a mobility management entity including a processor and a data reception and transmission interface, where:

The processor is configured to receive information about a CSG identifier, and an access mode, of a CSG local eNB, transmitted by a macro eNB; to determine whether to allow the user equipment to access the CSG local eNB, or to obtain CSG membership status information in subscription information of the user equipment, according to the information about the CSG identifier and the access mode, and the subscription information of the user equipment; and to return information about whether to allow the user equipment to access the CSG local eNB, or the CSG membership status information of the user equipment to the macro eNB; and The data reception and transmission interface is configured to communicate data between the processor and the macro eNB.

In summary, advantageous effects of the invention are as follows:

In the solutions according to the embodiments of the invention, after the macro eNB determines that the DRB of the user equipment needs to be transferred to the CSG local eNB, the macro eNB determines whether to allow the user equipment to access the CSG local eNB and initiates a bearer transfer procedure to the CSG local eNB upon determining that the user equipment is allowed to access the CSG local eNB, and in the bearer transfer procedure initiated by the macro eNB for the user equipment, the CSG local eNB receives a bearer transfer request, transmitted by the macro eNB, carrying the CSG membership status information of the user equipment and performs admission control on the bearer of the user equipment switched to the CSG local eNB according to the CSG membership status information. Apparently in these solutions, the macro eNB needs to determine whether to allow the user equipment to access the CSG local eNB, before initiating the bearer transfer procedure to the CSG local eNB, and may initiate the bearer transfer procedure to the CSG local eNB only if the user equipment is allowed to access the CSG local eNB, to thereby avoid the problem of a failure in the initiated bearer transfer because the user equipment is not a member of the CSG local eNB so that transmission and reception of data by the user equipment will not be affected to thereby improve a service experience of the user.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transferring a bearer in layered network deployment, the method comprising:
   determining, by a macro eNB, whether to allow a user equipment to access a Closed Subscriber Group, CSG, local eNB upon determining that a Data Radio Bearer, DRB, of the user equipment needs to be transferred to the CSG local eNB; and
   initiating, by the macro eNB, a bearer transfer procedure to the CSG local eNB upon determining that the user equipment is allowed to access the CSG local eNB;
   wherein determining whether to allow the user equipment to access the CSG local eNB comprises:
   determining, by the macro eNB, whether to allow the user equipment to access the CSG local eNB according to CSG membership status information carried in a measurement report made by the user equipment;
   wherein initiating the bearer transfer procedure to the CSG local eNB comprises:
   transmitting, by the macro eNB, a bearer transfer request carrying the CSG membership status information reported by the user equipment, to the CSG local eNB;
   wherein the method further comprises:
   transmitting, by the macro eNB, information about a CSG identifier, and an access mode, of the CSG local eNB to a Mobility Management Entity, MME, upon determining that the bearer has been transferred;
   receiving, by the macro eNB, information about whether to allow the user equipment to access the CSG local eNB, or the CSG membership status information of the user equipment, returned by the MME; and
   transmitting, by the macro eNB, the information returned by the MME to the CSG local eNB; or matching, by the macro eNB, the information returned by the MME with the CSG membership status information reported by the user equipment, and if they match successfully, then not transmitting the information returned by the MME to the CSG local eNB; otherwise, transmitting the information returned by the MME to the CSG local eNB.

2. The method according to claim 1, wherein the macro eNB determines that the DRB of the user equipment needs to be transferred to the CSG local eNB, upon reception of the measurement report made by the user equipment;

wherein the bearer transfer request is a user plane handover request message; and
wherein the macro eNB determines that the bearer has been transferred, upon reception of a user plane handover completion message transmitted by the user equipment; the macro eNB transmits the information about the CSG identifier, and the access mode, of the CSG local eNB to the MME in a path switch request message; the macro eNB receives the information about whether to allow the user equipment to access the CSG local eNB, or the CSG membership status information of the user equipment, returned by the MME in a path switch request response message; and the macro eNB transmits the information returned by the MME to the CSG local eNB in a path switch request response message.

3. The method according to claim 1, wherein the macro eNB determines that the DRB of the user equipment needs to be transferred to the CSG local eNB, upon reception of the measurement report made by the user equipment;
the bearer transfer request is a DRB link configuration message; and
the macro eNB determines that the bearer has been transferred, upon reception of a Radio Resource Control, RRC, connection reconfiguration completion message transmitted by the user equipment; the macro eNB transmits the information about the CSG identifier, and the access mode, of the CSG local eNB to the MME in a CSG check request message; and the macro eNB transmits the information returned by the MME to the CSG local eNB in a CSG modification message.

4. The method according to claim 1, wherein the macro eNB determines that the DRB of the user equipment needs to be transferred to the CSG local eNB, upon reception of an initial context setup request transmitted by the MME in a service request procedure initiated by the user equipment;
the bearer transfer request is a bearer setup request message; and
the macro eNB determines that the bearer has been transferred, upon reception of an RRC connection reconfiguration completion message transmitted by the user equipment; the macro eNB transmits the information about the CSG identifier, and the access mode, of the CSG local eNB to the MME in a CSG check request message; and the macro eNB transmits the information returned by the MME to the CSG local eNB in a CSG modification message.

5. A method for transferring a bearer in layered network deployment, the method comprising:
determining, by a macro eNB, whether to allow a user equipment to access a Closed Subscriber Group, CSG, local eNB upon determining that a Data Radio Bearer, DRB, of the user equipment needs to be transferred to the CSG local eNB; and
initiating, by the macro eNB, a bearer transfer procedure to the CSG local eNB upon determining that the user equipment is allowed to access the CSG local eNB;
wherein determining whether to allow the user equipment to access the CSG local eNB comprises:
transmitting, by the macro eNB, information about a CSG identifier, and an access mode, of the CSG local eNB to an MME;
receiving, by the macro eNB, information about whether to allow the user equipment to access the CSG local eNB, or CSG membership status information of the user equipment, returned by the MME; and determining, by the macro eNB, whether to allow the user equipment to access the CSG local eNB according to the information returned by the MME.

6. The method according to claim 5, wherein initiating the bearer transfer procedure to the CSG local eNB comprises:
transmitting, by the macro eNB, a bearer transfer request, carrying the CSG membership status information of the user equipment, returned by the MME to the CSG local eNB.

7. The method according to claim 6, wherein the macro eNB determines that the DRB of the user equipment needs to be transferred to the CSG local eNB, upon reception of a measurement report made by the user equipment; and
the macro eNB transmits information about a CSG identifier, and an access mode, of the CSG local eNB to the MME in a CSG check request message;
the bearer transfer request is a DRB link configuration message.

8. The method according to claim 6, wherein the macro eNB determines that the DRB of the user equipment needs to be transferred to the CSG local eNB, upon reception of an initial context setup request transmitted by the MME in a service request procedure initiated by the user equipment; and
the macro eNB transmits information about a CSG identifier, and an access mode, of the CSG local eNB to the MME in a CSG check request message; and
the bearer transfer request is a bearer setup request message.

9. The method according to claim 6, wherein the macro eNB determines that the DRB of the user equipment needs to be transferred to the CSG local eNB, upon reception of an initial context setup request transmitted by the MME in a service request procedure initiated by the user equipment; and
the macro eNB transmits information about a CSG identifier, and an access mode, of the CSG local eNB to the MME in an initial user equipment message; and the macro eNB receives the information about whether to allow the user equipment to access the CSG local eNB, or the CSG membership status information of the user equipment, returned by the MME in an initial context setup request message; and
the bearer transfer request is a bearer setup request message.

10. A method for transferring a bearer in layered network deployment, the method comprising:
receiving, by a Closed Subscriber Group, CSG, local eNB, a bearer transfer request, transmitted by a macro eNB, carrying CSG membership status information of a user equipment, in a bearer transfer procedure initiated by the macro eNB for the user equipment; and
performing, by the CSG local eNB, admission control on a bearer of the user equipment according to the CSG membership status information;
wherein the bearer transfer request carries the CSG membership status information which is CSG membership status information carried in a measurement report made by the user equipment;
wherein the method further comprises:
after the bearer has been transferred, receiving, by the CSG local eNB, information about whether to allow the user equipment to access the CSG local eNB, or the CSG membership status information of the user equipment, transmitted by the macro eNB; and
providing, by the CSG local eNB, a QoS support mechanism for the bearer of the user equipment switched to the CSG local eNB according to the information about whether to allow the user equipment to access the CSG local eNB, or the CSG membership status information of the user equipment;

wherein the bearer transfer request is a user plane handover request message; and the CSG local eNB receives the information about whether to allow the user equipment to access the CSG local eNB, or the CSG membership status information of the user equipment, transmitted by the macro eNB in a path switch request response message; or wherein the bearer transfer request is a DRB link configuration message; and the CSG local eNB receives the information about whether to allow the user equipment to access the CSG local eNB, or the CSG membership status information of the user equipment, transmitted by the macro eNB in a CSG modification message; or wherein the bearer transfer request is a bearer setup request message; and the CSG local eNB receives the information about whether to allow the user equipment to access the CSG local eNB, or the CSG membership status information of the user equipment, transmitted by the macro eNB in a CSG modification message.

11. A method for transferring a bearer in layered network deployment, the method comprising:
receiving, by a Closed Subscriber Group, CSG, local eNB, a bearer transfer request, transmitted by a macro eNB, carrying CSG membership status information of a user equipment, in a bearer transfer procedure initiated by the macro eNB for the user equipment; and
performing, by the CSG local eNB, admission control on a bearer of the user equipment according to the CSG membership status information;
wherein the bearer transfer request carries the CSG membership status information which is CSG membership status information of the user equipment obtained by the macro eNB from a MME; and
the CSG local eNB provides a QoS support mechanism for the bearer of the user equipment switched to the CSG local eNB further according to the CSG membership status information.

12. The method according to claim 11, wherein the bearer transfer request is a DRB link configuration message; or
the bearer transfer request is a bearer setup request message.

13. A method for transferring a bearer in layered network deployment, the method comprising:
receiving, by a Mobility Management Entity, MME, information about a CSG identifier, and an access mode, of a CSG local eNB, transmitted by a macro eNB;
determining, by the MME, whether to allow a user equipment to access the CSG local eNB, or obtaining CSG membership status information in subscription information of the user equipment, according to the information about the CSG identifier and the access mode, and the subscription information of the user equipment; and
returning, by the MME, information about whether to allow the user equipment to access the CSG local eNB, or the CSG membership status information of the user equipment to the macro eNB;
wherein the MME receives the information about the CSG identifier, and the access mode, of the CSG local eNB transmitted by the macro eNB in a path switch request message; and the MME returns the information about whether to allow the user equipment to access the CSG local eNB, or the CSG membership status information of the user equipment to the macro eNB in a path switch request response message; or
the MME receives the information about the CSG identifier, and the access mode, of the CSG local eNB transmitted by the macro eNB in a CSG check request message; or
the MME receives the information about the CSG identifier, and the access mode, of the CSG local eNB transmitted by the macro eNB in an initial user equipment message; and the MME returns the information about whether to allow the user equipment to access the CSG local eNB, or the CSG membership status information of the user equipment to the macro eNB in an initial context setup request message.

14. A macro eNB, comprising a processor and a data reception and transmission interface, wherein:
the processor is configured to determine whether to allow a user equipment to access a Closed Subscriber Group, CSG, local eNB upon determining that a Data Radio Bearer, DRB, of the user equipment needs to be transferred to the CSG local eNB; and
to initiate a bearer transfer procedure to the CSG local eNB upon determining that the user equipment is allowed to access the CSG local eNB; and
the data reception and transmission interface is configured to communicate data between the processor and the CSG local eNB;
wherein the processor configured to determine whether to allow the user equipment to access the CSG local eNB is configured to:
determine whether to allow the user equipment to access the CSG local eNB according to CSG membership status information carried in a measurement report made by the user equipment;
wherein the processor configured to initiate the bearer transfer procedure to the CSG local eNB is configured to:
transmit a bearer transfer request carrying the CSG membership status information reported by the user equipment, to the CSG local eNB;
wherein the processor is further configured to:
transmit information about a CSG identifier, and an access mode, of the CSG local eNB to a Mobility Management Entity, MME, upon determining that the bearer has been transferred;
receive information about whether to allow the user equipment to access the CSG local eNB, or the CSG membership status information of the user equipment, returned by the MME; and
transmit the information returned by the MME to the CSG local eNB; or match the information returned by the MME with the CSG membership status information reported by the user equipment, and if they match successfully, not to transmit the information returned by the MME to the CSG local eNB; otherwise, transmit the information returned by the MME to the CSG local eNB.

15. A macro eNB, comprising a processor and a data reception and transmission interface, wherein:
the processor is configured to determine whether to allow a user equipment to access a Closed Subscriber Group, CSG, local eNB upon determining that a Data Radio Bearer, DRB, of the user equipment needs to be transferred to the CSG local eNB; and to initiate a bearer transfer procedure to the CSG local eNB upon determining that the user equipment is allowed to access the CSG local eNB; and the data reception and transmission interface is configured to communicate data between the processor and the CSG local eNB;

wherein the processor configured to determine whether to allow the user equipment to access the CSG local eNB is configured to:

transmit information about a CSG identifier, and an access mode, of the CSG local eNB to an MME; receive information about whether to allow the user equipment to access the CSG local eNB, or CSG membership status information of the user equipment, returned by the MME; and determine whether to allow the user equipment to access the CSG local eNB according to the information returned by the MME.

* * * * *